US010884616B2

(12) United States Patent
Burfitt

(10) Patent No.: US 10,884,616 B2
(45) Date of Patent: *Jan. 5, 2021

(54) APPLICATION CONTROL USING A GESTURE BASED TRIGGER

(71) Applicant: Snap Inc., Santa Monica, CA (US)

(72) Inventor: Joseph Burfitt, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,797

(22) Filed: Oct. 9, 2019

(65) Prior Publication Data

US 2020/0249831 A1 Aug. 6, 2020

Related U.S. Application Data

(63) Continuation of application No. 15/169,288, filed on May 31, 2016, now Pat. No. 10,474,353.

(51) Int. Cl.
*G06F 3/0488* (2013.01)
*G06F 16/00* (2019.01)
(Continued)

(52) U.S. Cl.
CPC ........ *G06F 3/04883* (2013.01); *G06F 3/0485* (2013.01); *G06F 3/04845* (2013.01);
(Continued)

(58) Field of Classification Search
CPC ...... G06F 3/0485; G06F 3/04886; G06F 3/14; G06F 16/00; G06F 16/9032; G06F 2203/04806; G06Q 10/10
See application file for complete search history.

(56) References Cited

U.S. PATENT DOCUMENTS 5,754,939 A 5/1998 Herz et al.
6,038,295 A 3/2000 Mattes
(Continued)

FOREIGN PATENT DOCUMENTS

CA 2887596 A1 7/2015
CN 109564500 A 4/2019
(Continued)

OTHER PUBLICATIONS

"1-Click—Wikipedia, the free encyclopedia", [Online]. Retrieved from the Internet: <URL: https://en.wikipedia.org/wiki/1 -Click>, (Accessed May 26, 2016), 3 pgs.
(Continued)

*Primary Examiner* — Eric J. Bycer
(74) *Attorney, Agent, or Firm* — Schwegman Lundberg & Woessner, P.A.

(57) ABSTRACT

Systems and methods for control of application actions using a modification trigger to visually modify an electronic document are disclosed. A computing device, such as a mobile computing device having a touchscreen display, can display an electronic document having a first portion and a second portion. Initially upon displaying the electronic document, the computing device displays the first portion and the second portion may lie out of view, not displayed. A user can swipe along a scroll direction, causing the second portion to be displayed. The second portion can include or otherwise be associated with a modification trigger. Upon receiving a gesture on the second portion, the modification trigger performs actions, including, for example, subscribing to a series of electronic documents and minimizing the visual display of the electronic document.

20 Claims, 29 Drawing Sheets

(51) Int. Cl.
*G06F 3/0484* (2013.01)
*G06F 3/0485* (2013.01)
*G06F 16/9032* (2019.01)
*G06Q 10/10* (2012.01)
*G06F 3/14* (2006.01)

(52) U.S. Cl.
CPC ............ *G06F 3/04886* (2013.01); *G06F 3/14* (2013.01); *G06F 16/00* (2019.01); *G06F 16/9032* (2019.01); *G06Q 10/10* (2013.01); *G06F 2203/04806* (2013.01)

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root et al. |
| 9,224,095 B2 | 12/2015 | Booth et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,705,831 B2 | 7/2017 | Spiegel |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,291,573 B2 | 5/2019 | Ravishankar et al. |
| 10,474,353 B2 | 11/2019 | Burfitt |
| 10,609,036 B1 | 3/2020 | Allen et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0082941 A1 | 4/2008 | Goldberg et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0013266 A1 | 1/2009 | Gandhi et al. |
| 2009/0042588 A1 | 2/2009 | Lottin et al. |
| 2009/0132453 A1 | 5/2009 | Hangartner et al. |
| 2010/0042948 A1 | 2/2010 | Kim et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0117584 A1 | 5/2012 | Gordon |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0024808 A1 | 1/2013 | Rainisto |
| 2013/0071093 A1 | 3/2013 | Hanks et al. |
| 2013/0194301 A1 | 8/2013 | Robbins et al. |
| 2013/0290443 A1 | 10/2013 | Collins et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |

(56) References Cited

U.S. PATENT DOCUMENTS

| | | |
|---|---|---|
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0365349 A1 | 12/2014 | Kennon |
| 2015/0128014 A1 | 5/2015 | Monroe |
| 2015/0188873 A1 | 7/2015 | Halliday et al. |
| 2015/0193122 A1 | 7/2015 | Liu et al. |
| 2015/0199082 A1 | 7/2015 | Scholler et al. |
| 2015/0227602 A1 | 8/2015 | Ramu et al. |
| 2015/0269614 A1 | 9/2015 | Kramer |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0170623 A1 | 6/2016 | Lewis et al. |
| 2016/0180887 A1 | 6/2016 | Sehn |
| 2016/0196584 A1 | 7/2016 | Franklin et al. |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0161382 A1 | 6/2017 | Ouimet et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0344246 A1 | 11/2017 | Burfitt |
| 2017/0374003 A1 | 12/2017 | Allen et al. |
| 2017/0374508 A1 | 12/2017 | Davis et al. |

FOREIGN PATENT DOCUMENTS

| | | |
|---|---|---|
| EP | 3465404 B1 | 6/2020 |
| KR | 20130024808 A | 3/2013 |
| WO | WO-2012000107 A1 | 1/2012 |
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2017210129 A1 | 12/2017 |
| WO | WO-2018005644 A1 | 1/2018 |

OTHER PUBLICATIONS

"U.S. Appl. No. 15/169,288, Non Final Office Action dated Oct. 18, 2018", 13 pgs.

"U.S. Appl. No. 15/169,288, Notice of Allowance dated Jul. 2, 2019", 9 pgs.

"U.S. Appl. No. 15/169,288, Response filed Mar. 18, 2019 to Non Final Office Action dated Oct. 18, 2018", 16 pgs.

"U.S. Appl. No. 15/289,676, Final Office Action dated Jul. 15, 2019", 20 pgs.

"U.S. Appl. No. 15/289,676, Non Final Office Action dated Oct. 25, 2018", 16 pgs.

"U.S. Appl. No. 15/289,676, Notice of Allowance dated Jul. 18, 2019", 18 pgs.

"U.S. Appl. No. 15/289,676, Response filed Apr. 24, 2019 to Non Final Office Action dated Oct. 25, 2018", 21 pgs.

"U.S. Appl. No. 15/289,676, Response filed Oct. 15, 2019 to Final Office Action dated Jul. 15, 2019", 24 pgs.

"U.S. Appl. No. 16/800,868, Preliminary Amendment filed May 12, 2020", 8 pgs.

"European Application Serial No. 17729970.9, Response filed Jul. 22, 2019 to Communication pursuant to Rules 161(1) and 162 EPC dated Jan. 10, 2019", w/ English Claims, 76 pgs.

"International Application Serial No. PCT/US2017/034782, International Preliminary Report on Patentability dated Dec. 13, 2018", 9 pgs.

"International Application Serial No. PCT/US2017/034782; International Search Report dated Oct. 4, 2017", 3 pgs.

"International Application Serial No. PCT/US2017/034782, Written Opinion dated Oct. 4, 2017", 7 pgs.

"Korean Application Serial No. 10-2018-7038039, Notice of Preliminary Rejection dated Mar. 31, 2020", w/ English translation, 9 pgs.

Bias, Lorena, et al., "Kim Kardashian Robbery Puts Spotlight on Celebrity Security", USA Today, D.2. ProQuest., [Online] Retrieved from the Internet on Nov. 9, 2019: <URL: http://dialog.proquest.com/professional/docview/1825640504?accountid=131444>, (Oct. 4, 2016), 4 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible for", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"Korean Application Serial No. 10-2018-7038039, Response filed Jun. 15, 2020 to Notice of Preliminary Rejection dated Mar. 31, 2020", w/ English Claims, 26 pgs.

"European Application Serial No. 20181733.5, Extended European Search Report dated Sep. 24, 2020", 8 pgs.

APPLICATION CONTROL USING A GESTURE BASED TRIGGER

PRIORITY CLAIM

This application is a continuation of and claims the benefit of priority of U.S. Pat. No. 10,474,353, filed on May 31, 2016, which is hereby incorporated by reference herein in its entirety.

TECHNICAL FIELD

The subject matter disclosed herein relates generally to control of an application through a display device and, more particularly, but not by way of limitation, to control of an application through a display device using gesture based triggers.

BACKGROUND

Users can interact with applications executing on mobile devices through touchscreen displays of the mobile devices. The touchscreen displays have limited screen size, and only a limited number of user interface objects, such as input and output elements (e.g., on-screen keyboard), menus, and other user interface objects (e.g., checkboxes, text entry fields), can be displayed on a given touchscreen display at any one time. These limitations make controlling applications through mobile devices difficult and can overall hamper user experience. Further, in some cases, some users may be limited to manipulating their respective mobile devices with only one available hand, which further worsens user experience.

BRIEF DESCRIPTION OF THE DRAWINGS

Some example embodiments are illustrated by way of example and not limitation in the figures of the accompanying drawings.

DETAILED DESCRIPTION

In the following description, for the purposes of explanation, numerous specific details are set forth in order to provide an understanding of various example embodiments of the present subject matter. It will be evident, however, to those skilled in the art, that the example embodiments of the present subject matter may be practiced without these specific details.

In various example embodiments, a computing device, such as a mobile computing device having a touchscreen display, can display an electronic document having a first portion and a second portion. The axis or direction of navigation of the electronic document corresponds to the orientation of the first and second portions; e.g., an electronic document having a first portion above a second portion defines a vertical axis of navigation (e.g., scroll direction), as according to an example embodiment. When the electronic document is initially displayed on the client device, the first portion may be displayed and the second portion may lie out of view, not displayed. As mentioned, a user may make a swipe gesture, e.g., swipe up, on the touchscreen along the axis of navigation, in a scroll direction, causing the second portion to be displayed (e.g., the first portion scrolls up and out of view, and the second portion scrolls into view from the bottom of the touchscreen display).

The second portion includes a gesture trigger, such as a modification trigger, that is configured to, upon execution of the trigger, minimize or otherwise remove the electronic document from the touchscreen display. The gesture trigger may further be configured to, upon execution of the trigger, perform further actions, such as subscribing to a series of electronic documents or submitting a transaction. In an example embodiment, the gesture trigger is triggered when a user swipes along a direction of navigation, on the second portion, through the touchscreen display.

Figure 1:
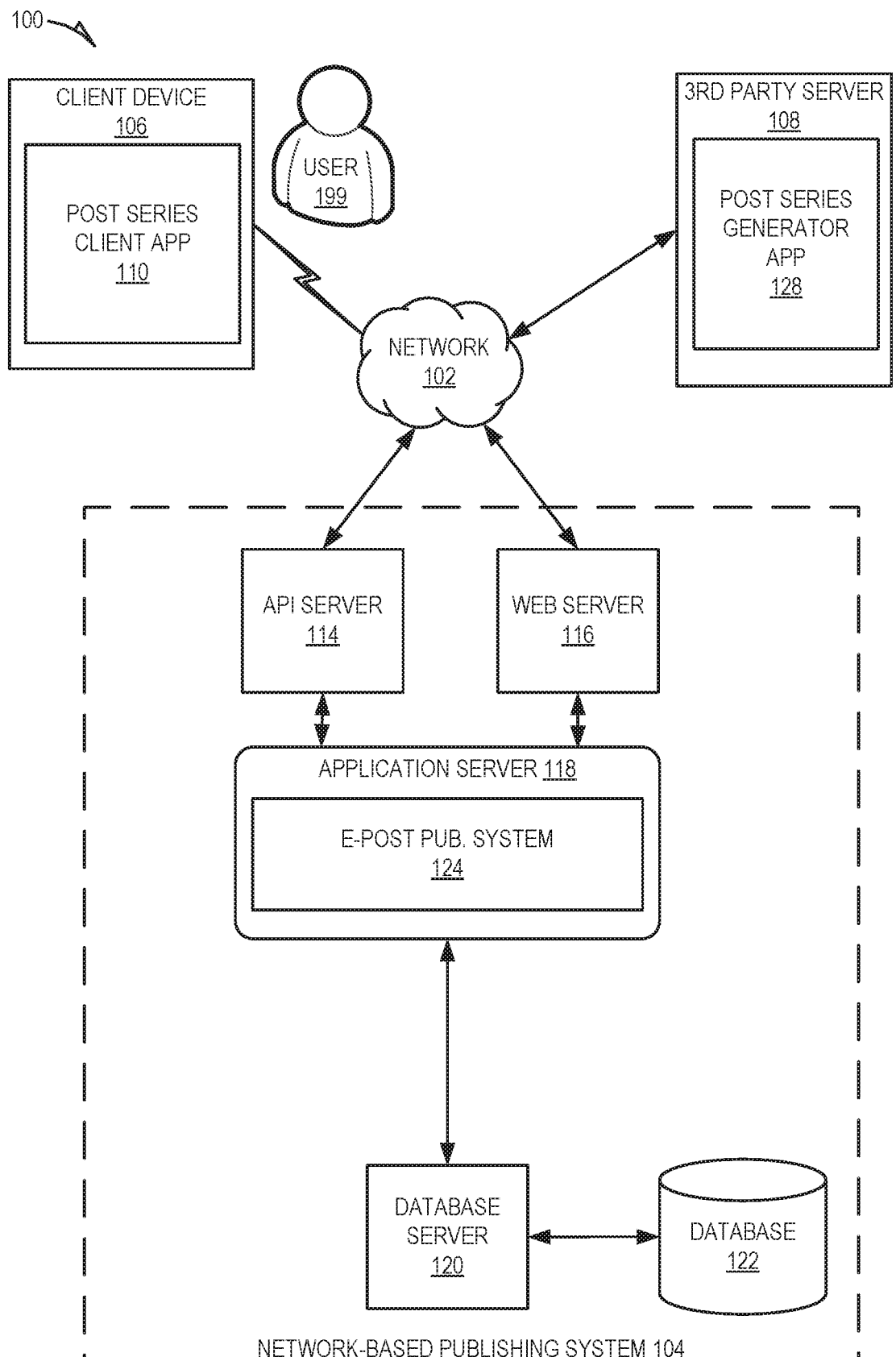
FIG. 1 is a block diagram illustrating a networked system, according to some example embodiments.

With reference to FIG. 1, an example embodiment of a high-level client-server-based network architecture 100 is shown. A network-based publishing system 104, in the example form of a post publication system, provides server-side functionality via a network 102 (e.g., the Internet or wide area network (WAN)) to one or more client devices 106. In some implementations, a user (e.g., user 199) interacts with the network-based publishing system 104 using the client device 106.

FIG. 1 illustrates, for example, client device 106 including a post series client application 110 through which user 199 may receive and view ephemeral posts and electronic documents, each of which may be part of a post series. A post series is a series of web posts generated by a third party server 108 or other users through their own respective client devices executing post series client applications. In some example embodiments, a post series can be all posts from an individual user that user 199 can receive and display on client device 106. The posts may be ephemeral and automatically be removed from display or deleted from client device 106 after a specified time. Similarly, electronic documents may also be part of a series in that they all come from the same source (e.g., same user, same publisher) or are otherwise identified as part of a specific series through a common identifier (e.g., a company name, post series name).

In various implementations, the client device 106 includes a computing device that includes at least a display and communication capabilities that provide access to the network-based publishing system 104 via the network 102. The client device 106 includes, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 106 includes one or more of a touch screen, accelerometer, gyroscope, biometric sensor, camera, microphone, Global Positioning System (GPS) device, and the like.

The client device 106 communicates with the network 102 via a wired or wireless connection. For example, one or more portions of the network 102 includes an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

As discussed above, in some example embodiments, the client device 106 includes one or more of the applications such as post series client application 110. In some implementations, the post series client application 110 includes various components operable to present information to the user 199 and communicate with network-based publishing system 104 as discussed in further detail below.

The post series client application 110 may be implemented as a stand-alone application executed on top of the operating system of client device 106, as according to some example embodiments. In some example embodiments, the post series client application 110 runs within a web client (e.g., browser) on the client device 106 to access the various systems of the networked system 104 via the web interface supported by a web server 116. Similarly, according to some example embodiments, the post series client application 110 accesses the various services and functions provided by the network-based publishing system 104 via a programmatic interface provided by an Application Program Interface (API) server 114.

Users (e.g., the user 199) can include a person, a machine, or other means of interacting with the client device 106. In some example embodiments, the user is not part of the network architecture 100, but interacts with the network architecture 100 via the client device 106 or another means. For instance, the user provides input (e.g., touch screen input or alphanumeric input) to the client device 106 and the input is communicated to the network-based publishing system 104 via the network 102. In this instance, the network-based publishing system 104, in response to receiving the input from the user, communicates information to the client device 106 via the network 102 to be presented to the user. In this way, the user can interact with the network-based publishing system 104 using the client device 106.

The API server 114 and the web server 116 are coupled to, and provide programmatic and web interfaces respectively to, one or more application server 118. The application server 118 can host an electronic post publication system 124 that includes one or more modules or applications, each of which can be embodied as hardware, software, firmware, or any combination thereof. The application server 118 is, in turn, shown to be coupled to one or more database servers 120 that facilitate access to one or more information storage repositories or database(s) 122. In an example embodiment, the database(s) 122 are storage devices that store information to be posted (e.g., posts, electronic documents, series thereof) via the electronic post publication system 124. The database(s) 122 store subscription information, payment information, inventory information, order information, and user information (e.g., user profile data, username/password, preferences of user 199) to perform the operations discussed below.

Additionally, a post series generator app 128, executing on third party server 108, is shown as having programmatic access to the network-based publishing system 104 via the programmatic interface provided by the API server 114. The post series generator app 128 is, according to some example embodiments, an application configured to publish posts (e.g., ephemeral posts) and electronic documents to the electronic post publication system 124 for publication to one or more post series client applications 110 of subscribing users.

Further, while the client-server-based network architecture 100 shown in FIG. 1 employs a client-server architecture, the present subject matter is, of course, not limited to such an architecture, and can equally well find application in a distributed, or peer-to-peer, architecture system, for example. The various systems of the applications server(s) 118 (e.g., the electronic post publication system 124) can also be implemented as standalone software programs, which do not necessarily have networking capabilities.

Figure 2:
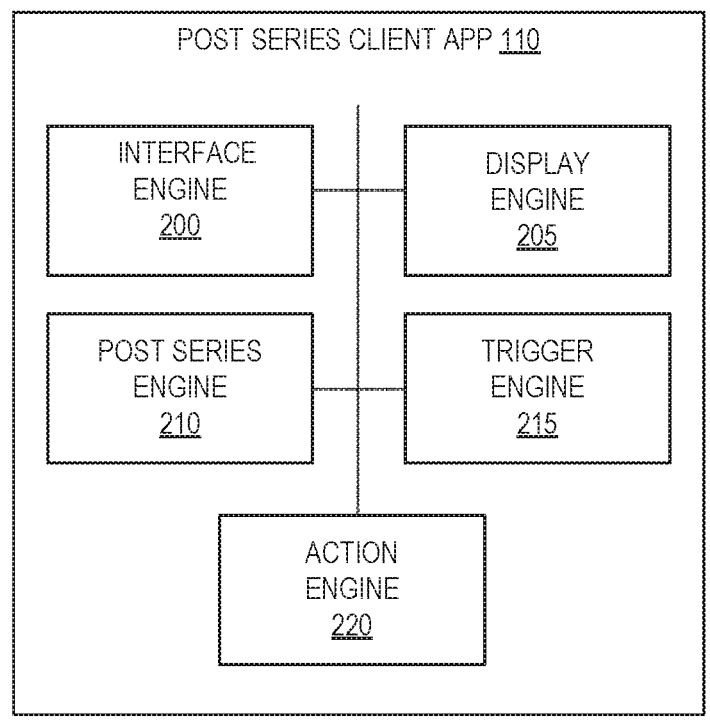
FIG. 2 is a block diagram showing example components provided within the post series client application system of FIG. 1, according to some example embodiments.

FIG. 2 illustrates a block diagram showing components in the post series client application 110, according to some example embodiments. The components themselves are communicatively coupled (e.g., via appropriate interfaces) to each other and to various data sources, so as to allow information to be passed between the applications or so as to allow the applications to share and access common data. Furthermore, the components access one or more database(s) 122 via the database server 120. To this end, the post series client application 110 includes an interface engine 200, a display engine 205, post series engine 210, trigger engine 215, and an action engine 220, as according to an example embodiment.

The interface engine 200 is configured (e.g., by software) to interface the post series client application 110 with the client device 106. In some example embodiments, the client device 106 implements a native operating system having a Library of interface objects and look-and-feel specifications. For example, the client device 106 may be a mobile phone or smartphone, and the native operating system may be a mobile native operating system that can download applications or "apps" from an app store for local execution.

Users, such as user 199, may interact with the downloaded apps through a touchscreen display of the client device 106. In some example embodiments, the operating system of the client device 106 includes native functionality to receive user input and interpret user interactions through the touchscreen display. The native operating system may forward the interpreted user interactions to interface engine 200, for example, when the user interaction involves selection or manipulation of objects in a user interface of the post series client application 110. The interface engine 200 may receive the interpreted user interactions and complete operations in concert with the other engines of the post series client application 110. Still, in some example embodiments, the interface engine 200 is configured to natively receive and interpret user interactions as gestures in place of the client device 106; such as, for example, in implementations where the client device 106 does not include such native functionality.

The display engine 205 is responsible for displaying the user interface elements in conjunction with the other engines in the post series client application 110. For example, in response to a user selecting (e.g., clicking, tapping, or tapping-and-holding) an icon for an electronic document, the display engine 205 may receive a gesture notification from the interface engine 200 that the electronic document icon has been selected and, in response, the display engine 205 may generate a display of the selected elements on the display of the client device 106.

The post series engine 210 is responsible for managing the posts, which may include electronic documents or other types of posts, such as ephemeral posts. In some example embodiments, ephemeral posts have a smaller file size than electronic documents, though both electronic documents and ephemeral posts may be only temporarily accessible through the client device 106, as discussed in further detail below. The electronic documents may have one or more portions (e.g., top portion, middle portion, bottom portion) that a user can scroll or navigate to along a direction of navigation; for example, where the electronic document has a total display size (e.g., pixel size) that is larger than the available screen size (e.g., pixel screen size) of the display screen of the client device 106. In those implementations, the display engine 205 may receive one or more navigation gestures from the interface engine 200. The navigation gestures may include one or more of the following: swipes, drag-and-hold in a direction, double tap on edge of document to navigate in the direction of the edge, and other navigation interactions. Responsive to the received navigation gestures, the display engine 205 may scroll or navigate to a portion of the electronic document that is not currently viewable or displayed on the display screen of the client device 106.

The trigger engine 215 is responsible for managing the trigger actions of the post series client application 110. In some example embodiments, the trigger engine 215 activates a trigger (e.g., a modification trigger), in response to portions of an electronic document being displayed. The trigger engine 215 is further configured to execute the trigger. The trigger specifies a function for handling by the action engine 220. The function specifies one or more actions to be performed.

The action engine 220 is configured to perform one or more actions in response to the trigger engine 215 executing the trigger. In particular, according to at least one example embodiment, in executing the trigger, the trigger engine 215 specifies a function configured to perform different actions, such as terminating, closing, or minimizing the displayed electronic documented, creating a subscription request, and transmitting the subscription request. In some example embodiments, the trigger is configured to direct or redirect the client device 106 to a website upon the trigger being executed. In some example embodiments, the trigger is configured to, upon the trigger being executed, retrieve content (e.g., electronic documents) that is similar to the current electronic document. The similar content may be retrieved from the e-post publication system 124. Further, in some example embodiments, the similar content is retrieved from third party servers, such as third party server 108. The similar content may then be stored by the post series client application 110 for later display, or may automatically be displayed upon being retrieved.

In some example embodiments, the trigger is configured to, upon the trigger being executed, start a communication with a chat-bot or human agent of the provider of the electronic document or the series. In some example embodiments, the trigger is configured via the executable code to, upon the trigger being executed, submit a search to a search engine and display results. In those example embodiments, the executable code may specify a search string and a search engine server to perform the search upon the trigger being executed. The search string may include or otherwise specify keywords that are in the electronic document. For example, the electronic document may discuss ideas for things to do in a given city, e.g., New York City, and the trigger may be configured to search for flights to New York City, upon the user 199 swiping up. Once the gesture is received, the action engine 220 causes the client device 110 to transmit the search string to a search engine or flight website, and the results are returned for display on client device 110, as according to some example embodiments. Accordingly, the trigger can be configured to perform other client device or network communication operations in a similar manner (e.g., configuring the executable code to perform the desired operation).

Figure 3:
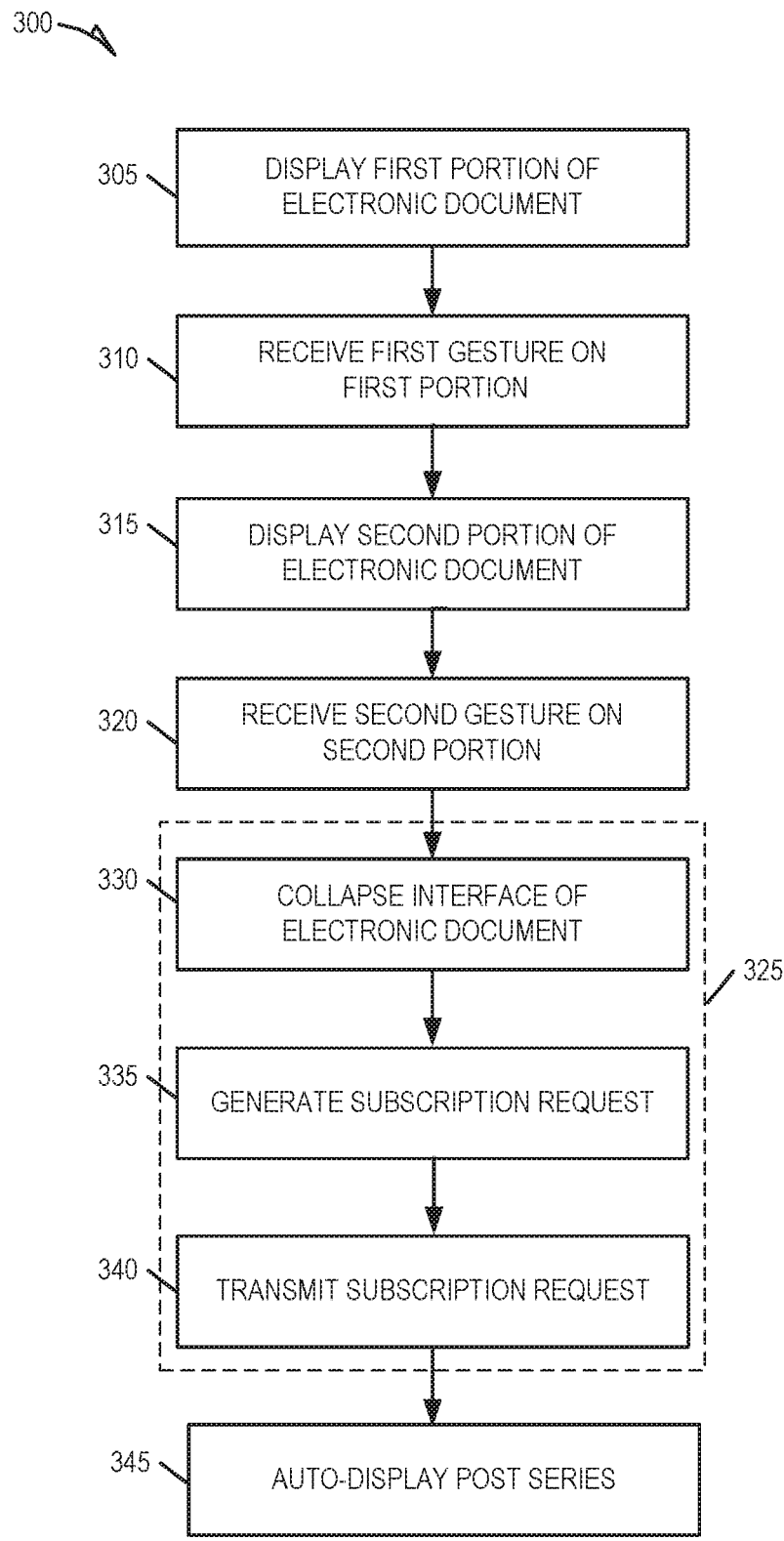
FIG. 3 is a flow diagram illustrating an example method for using a gesture based trigger in a subscription process, according to some example embodiments.

FIG. 3 illustrates a flowchart for a method 300 of performing a subscription request using a modification trigger, as according to some example embodiments. At operation 305, the display engine 205 displays a first portion of an electronic document on the client device 106. At operation 310, a first gesture is received by the client device 106. In some example embodiments, the first gesture is received directly on the first portion of the electronic document, through the touchscreen display of the client device 110.

At operation 315, in response to receiving the first gesture on the first portion of the electronic document, the display engine 205 displays a second portion of the electronic document. In some example embodiments, the display engine 205 displays the second portion of the electronic document using a scrolling transition (e.g., sliding the first portion off display while sliding the second portion onto the display). Other transitions, such as panning, sliding, fading in/out, may be similarly implemented to display the second portion of the electronic document.

At operation 320, the interface engine 200 receives an indication that a second gesture was made on a second portion of the electronic document, in some example embodiments, the information is generated from the native operating system of the client device 106.

As illustrated, operations 330, 335, and 340 may be included as part of a trigger operation 325. In some example embodiments, the trigger operation 325 is executed when the second portion of the electronic document is displayed and a swipe up gesture is received on the second portion. The direction "up" may be relative to the orientation of the client device 106 or the orientation of the displayed application, where for example, the application display has been rotated 180 degrees responsive to the client device 106 being rotated.

Continuing at operation 330, in response to receiving the second gesture on the second portion, the display engine 205 collapses (e.g., minimizes) the interface of the electronic document. In some example embodiments, the collapse of the interface of the electronic document includes removing from display the first portion, the second portion, and any other portions included within the body of the electronic document. Further, in some example embodiments, the collapsing of the interface of the electronic document includes removing from display the one or more portions and minimizing the electronic document to an icon within a primary application display area of the post series client application 110.

At operation 335, the action engine 220 generates a subscription request. In some example embodiments, the subscription request includes information such as the time at which the second gesture was received (e.g., operating system time of client device 106, time of receipt of the gesture information by interface engine 200), user data (e.g., username/password), verification tokens, client ID, network ID, payment information that may be included along with the subscription request. At operation 340, the action engine 220 transmits the subscription request to the interface engine 200, which transmits the subscription request through network 102 to API server 114 to application server 118 and finally to the destination, the electronic post publication system 124. As described in further detail below, the electronic post publication system 124 may use the data in the subscription request to update information (e.g., subscription information) for user 199 in database 122 via database server 120.

At operation 345, the display engine 205 may automatically display future posts or electronic documents received from the electronic post publication system 124. In some example embodiments, the posts received at operation 345 are posts or electronic documents published after the point in time in which the second gesture was received at operation 320. The display operations of operation 345 may be automatically configured so that the client/server exchange patterns are reversed. For example, the one or more servers 118 may initiate communications with the post series client application 110 by pushing future posts or electronic documents to the client device 106 for automatic download and/or display.

Figure 4:
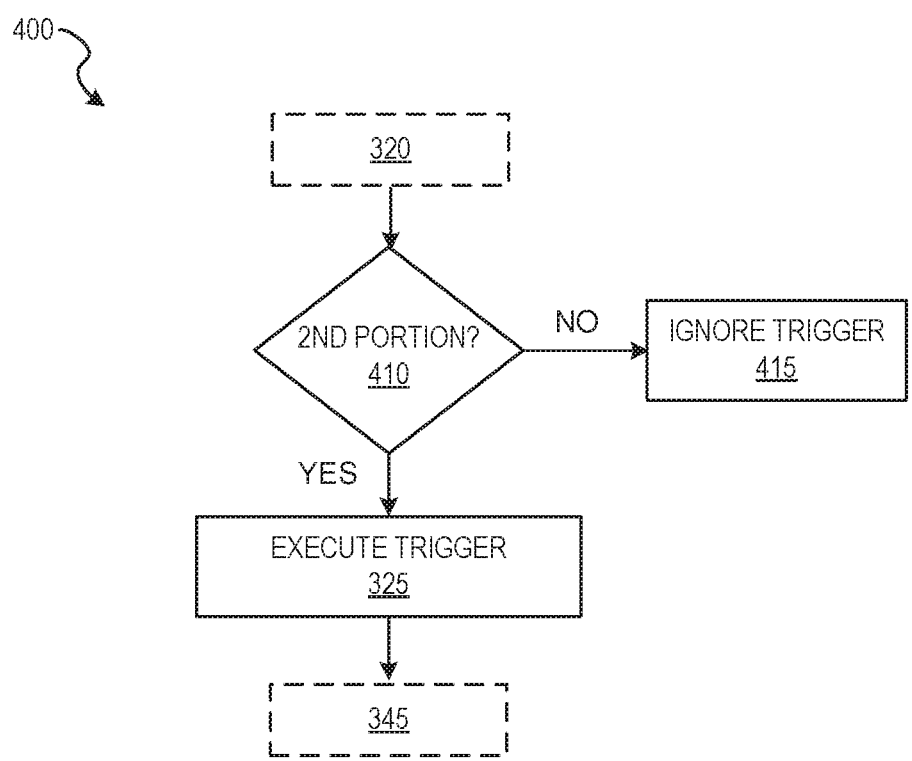
FIG. 4 is a flow diagram illustrating an example method for executing the gesture based trigger, according to some example embodiments.

FIG. 4 illustrates a flow chart for a method 400 for trigger execution, as according to some example embodiments. The operations of method 400 may be a sub-routine between the operation 320 (in which the second gesture is received) and operation 345 (which is an operation occurring in response to the trigger being executed) of FIG. 3.

As discussed, at operation 320, the interface engine 200 receives an indication that a gesture has been received through the display screen of the client device 106. The gesture may be in any direction, e.g., up/down, right/left with respect to the orientation of the client device 106 or displayed application.

At operation 410, the trigger engine 215 determines whether the second portion of the electronic document is currently being displayed on the client device 106. If the second portion of the electronic document is not displayed (e.g., the first portion of the electronic document is being displayed), then at operation 415, the trigger is not executed. Alternately, going back to operation 410, if it is determined that the second portion of the electronic is being displayed, then at operation 325, the trigger is executed by the trigger engine 215, thereby causing operations 330, 335, and 340 to be performed, as discussed above.

Figure 5:
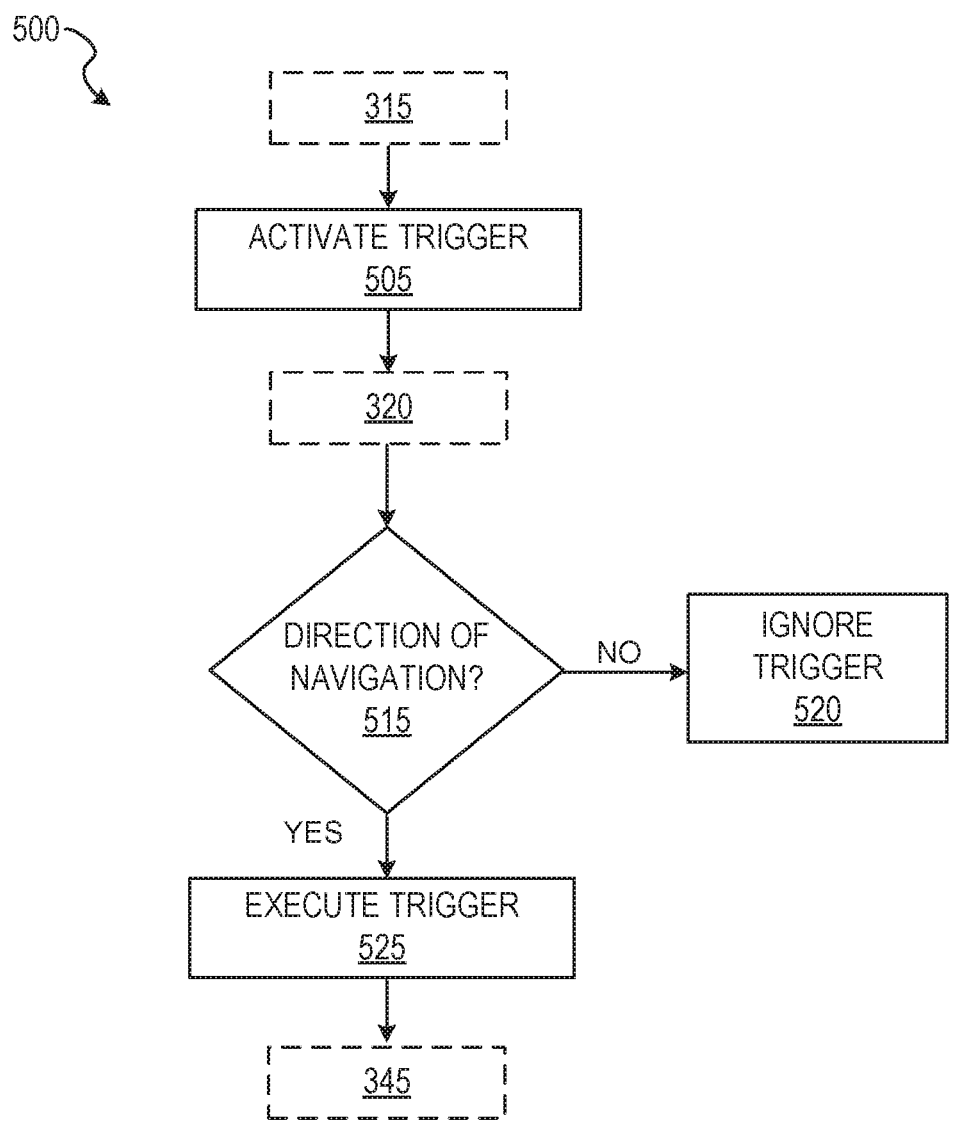
FIG. 5 is a flow diagram illustrating an example method for executing the gesture based trigger, according to some example embodiments.

FIG. 5 illustrates a flowchart for a method 500 of executing the trigger, as according to some example embodiments. The method 500 of FIG. 5 may be combined with FIG. 3, as illustrated. In particular, for example, the operation 315 involve displaying the second portion of the electronic document. When the second portion of the electronic document is displayed, at operation 505 the trigger is activated by the trigger engine 215. The activation of the trigger at operation 505 occurs between operations 315 and 320 of FIG. 3, according to some example embodiments.

In some example embodiments, the operation of activating the trigger at operation 505 is performed by loading executable code into a memory portion of the client device 106 in response to displaying the second portion. For example, the second portion can include embedded trigger code that activates the trigger when the second portion is displayed or rendered on the post series client application 110. In some example embodiments, loading the second portion of the electronic document loads a control object into the memory of the client device 106. The control object is managed by the client device 110 operating system, and is included natively as a feature that applications built for the client device 110 operation system can invoke, as according to some example embodiments. In those example embodiments, the control object activates and awaits receipt of gestures in a specified direction to execute the trigger. For example, the specified direction may be along the direction of navigation, e.g., an upward swipe.

At operation 320, the interface engine 200 receives an indication from the client device 106 that the user of the client device 106 has made a gesture through the display screen. At operation 515, the trigger engine 215 determines whether the received gesture is in the specified direction of navigation. If the gesture is not made in the direction of navigation, then at operation 520, the trigger is not executed. If it is determined at operation 515 that the gesture received at operation 510 is in the direction specified, then the trigger engine 215 executes the trigger at operation 525, thereby causing operations 330, 335, and 340 to be performed, as discussed above. After the trigger is executed, at operation 345, the display engine 205 may automatically download and display future posts or electronic documents received from the electronic post publication system 124.

Figure 6:
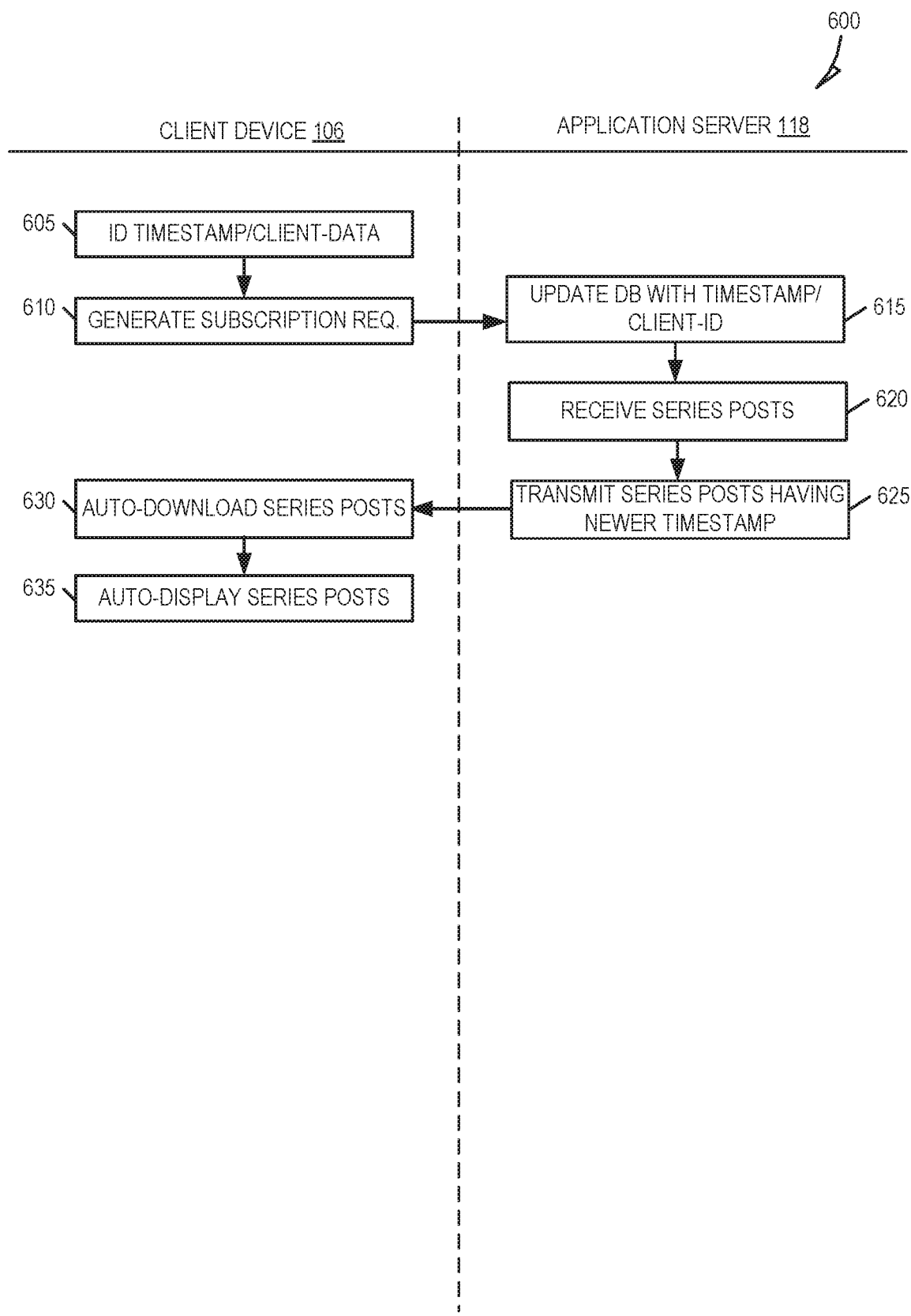
FIG. 6 is an interaction diagram illustrating network interactions between a client device and an application server, according to example embodiments.

FIG. 6 illustrates an interaction diagram between the client device 106 and the application server 118. Although FIG. 6 illustrates a client device 106 and application server 118, one of ordinary skill in the art appreciates the client device 106 may perform the operations in FIG. 6 through the post series client application 110, and the application server 118 may perform the operations in FIG. 6 through the electronic post publication system 124. The operations of FIG. 6 illustrate a method 600 for generating a subscription request in response to a modification trigger being executed.

At operation 605, the action engine 220 identifies data for inclusion in the subscription request. The information may include a timestamp and client data. The timestamp is identified by looking up current client device 106 time or determining the time when the gesture was performed, or determining the time when an indication of the gesture being performed is received by interface engine 200. The client data includes information needed to submit a subscription request, including one or more of the following: user identification, verification information (e.g., username, password, or authentication token), identification of the series of posts to subscribe to, and type of subscription (e.g., levels of service, frequency of publication, etc.), payment information for paid subscription, or other data needed to subscribe.

At operation 610, the action engine 220 uses the information gathered at operation 605 and any network information (e.g., server address, requisite API data) needed to generate the subscription request. The generated subscription request is then transferred from the client device 106 to the application server 118.

At operation 615, the application server 118 receives the subscription request and uses the data in the subscription request to update a database, such as local database 122, with the timestamp data and the client data of operation 605. At operation 620, application server 118 receives other series posts, such as additional electronic documents or other ephemeral posts for publication. In some example embodiments, the additional electronic documents or ephemeral posts may be received from third party server 108 through a post series generator app 128. The electronic post publication system 124 receives the one or more additional series posts from third party server 108 and stores them in database 122 via database server 120. A post may be identified via the post series engine 210 as belonging to a particular series via a series identifier tag or data value. Series from different third party servers may be stored by their respective identifiers in database 122 by the electronic post publication system 124.

At operation 625, the application server 118 transmits posts having newer timestamps for automatic download by client device 106 in response to a request checking for new posts from client device 106 or as part of a push operation.

At operation 630, the client device 106 may automatically download the series posts. For example, the post series client application 110 may be configured to automatically download the newer posts without user interaction. In particular, when the post series client application 110 is initiated (e.g., starts-up) on client device 106, the post series engine 210 may send a request to electronic post publication system 124 to check for any new posts published since the post series client application 110 was last closed. Further, in some example embodiments, the automatic download of operation 630 may be implemented as a push operation, where the client device 106 is configured to automatically download the pushed publications while the client device 106 is running. Further, in some example embodiments, when the post series client application 110 is closed or not running, the native operating system of the client device 106 may still receive notification of the push operation from application server 118 and create a push notification on the display of the client device 106 and/or download the new posts as a background process so that when the post series client application 110 is initiated, the newer posts may be retrieved from local memory of the client device 106.

At operation 635, the client device 106 may automatically display the newer series posts upon receipt. In some example embodiments, the client device 106 may download the newer posts and not display the content of the posts (e.g., first portion, second portion), but instead show an icon for the post (e.g., thumbnail) that indicates new posts have been downloaded. Example indications may include a visible modification of the default icon (e.g., read posts may be grayed out, but newer unread posts may be lighter or more vibrantly colored), animations, or visible overlay tags.

Figure 7A:
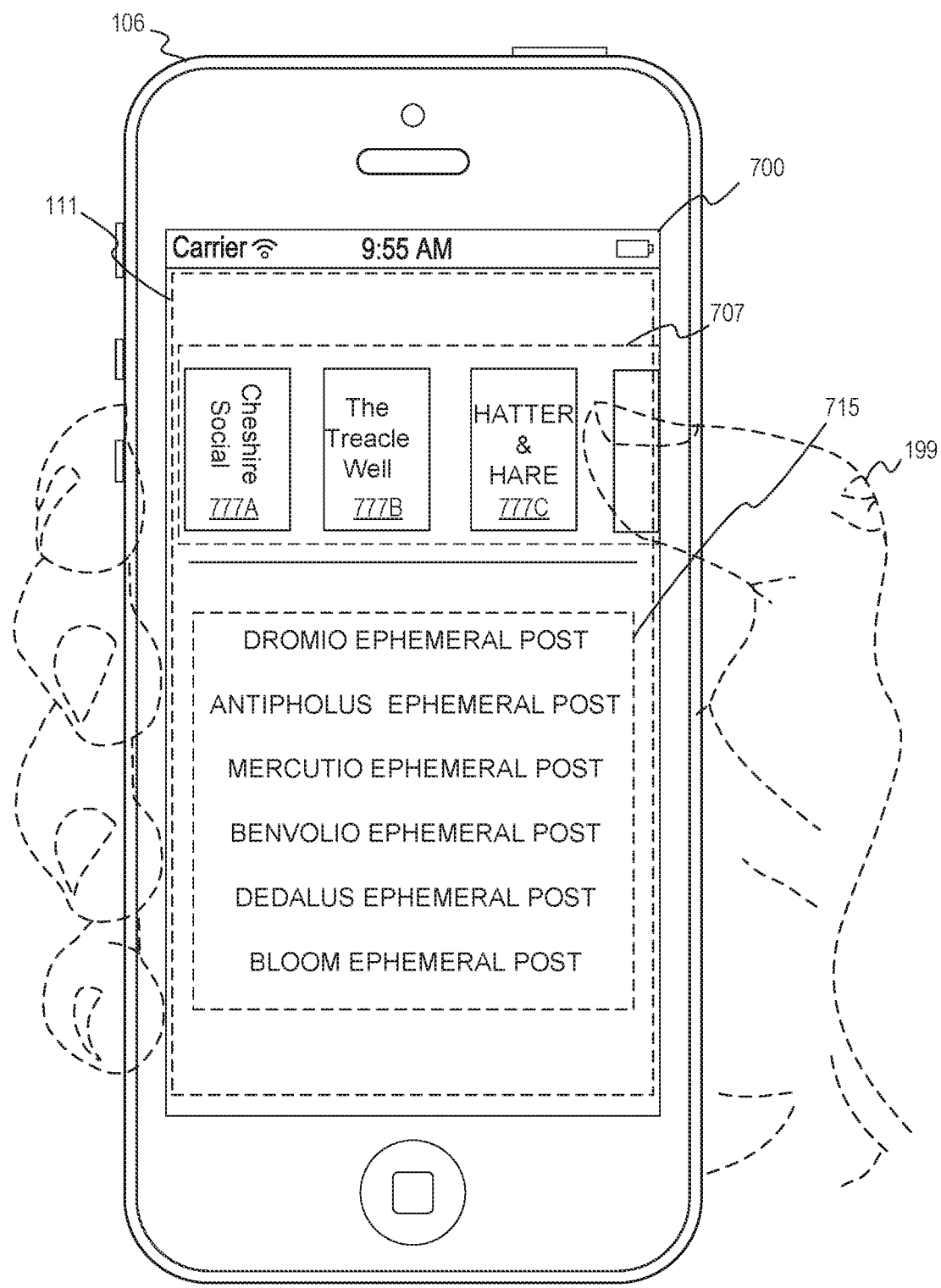
FIGS. 7A-K show user interfaces illustrating use of a gesture based trigger, according to example embodiments.

FIG. 7A illustrates client device 106 implemented, as an example, as a smartphone having a touchscreen display 700 that allows a user 199 to interact with the post series client application 110.

As illustrated, the post series client application 110 includes a display of a plurality of electronic documents represented by icons 777A-C in a electronic document display area 707, as according to an example embodiment. The plurality of electronic documents may be populated within display area 707 according to usage data of user 199.

The usage data may be collected and stored by client device 106 as user 199 uses post series client application 110. The usage data, for example, may include one or more of the following: most commonly accessed electronic documents, most commonly accessed ephemeral posts, the type of content in the accessed electronic documents or ephemeral posts, geographical location data collected from the GPS sensor of client device 106 (e.g., location data indicating that user 199 is near London, New York City, etc.), or past subscriptions to series posts. In some example embodiments, the user 199 may navigate an electronic document catalog from which the user 199 may browse through different electronic documents for selection and subscription.

It is appreciated that the actual content of the documents (e.g., first portion, second portion) may not be displayed in the electronic document display area but rather be linked to by a corresponding icon for each document or documents in the series. For example, "Cheshire Social" may correspond to a series of electronic documents that are represented by an icon 777A; "The Treacle Well" may correspond to a series of electronic documents that are represented by an icon 777B; and "Hatter & Hare" may correspond to a series of electronic documents represented by an icon 777C. Though only three series and corresponding icons 777A-C are depicted, it is appreciated that any number of series and icons may be displayed within display area 707, for example, in an alternating manner (e.g., carousel scroll). When the user 199 selects one of the icons 777A-C, the post series engine 210 retrieves the newest electronic document of the series from local memory of the client device 106 and loads it on the touchscreen display 700. In some example embodiments, if the newest electronic document has not been downloaded to local memory of the client device 106, the post series client application 110 may transmit a server request to electronic post publication system 124 requesting the latest electronic documents.

Further, according to some example embodiments, the post series client application 110 also displays a plurality of ephemeral posts in the ephemeral display area 715. When user 199 selects one of the posts, the post series engine 210 may retrieve the latest post from local memory or electronic post publication system 124 and display it. The ephemeral posts may display an image, a video, and/or a text for a preconfigured duration of time before automatically being deleted or removed from the display interface of the touchscreen display 700. The duration of time may be preconfigured by the creator of the post (e.g., another user), the post series client application 110 or the electronic post publication system 124. As with the electronic documents, each ephemeral post may belong to a series from other users. For example, all posts from the user "Dromio" may be considered as part of the same series.

Figure 7B:
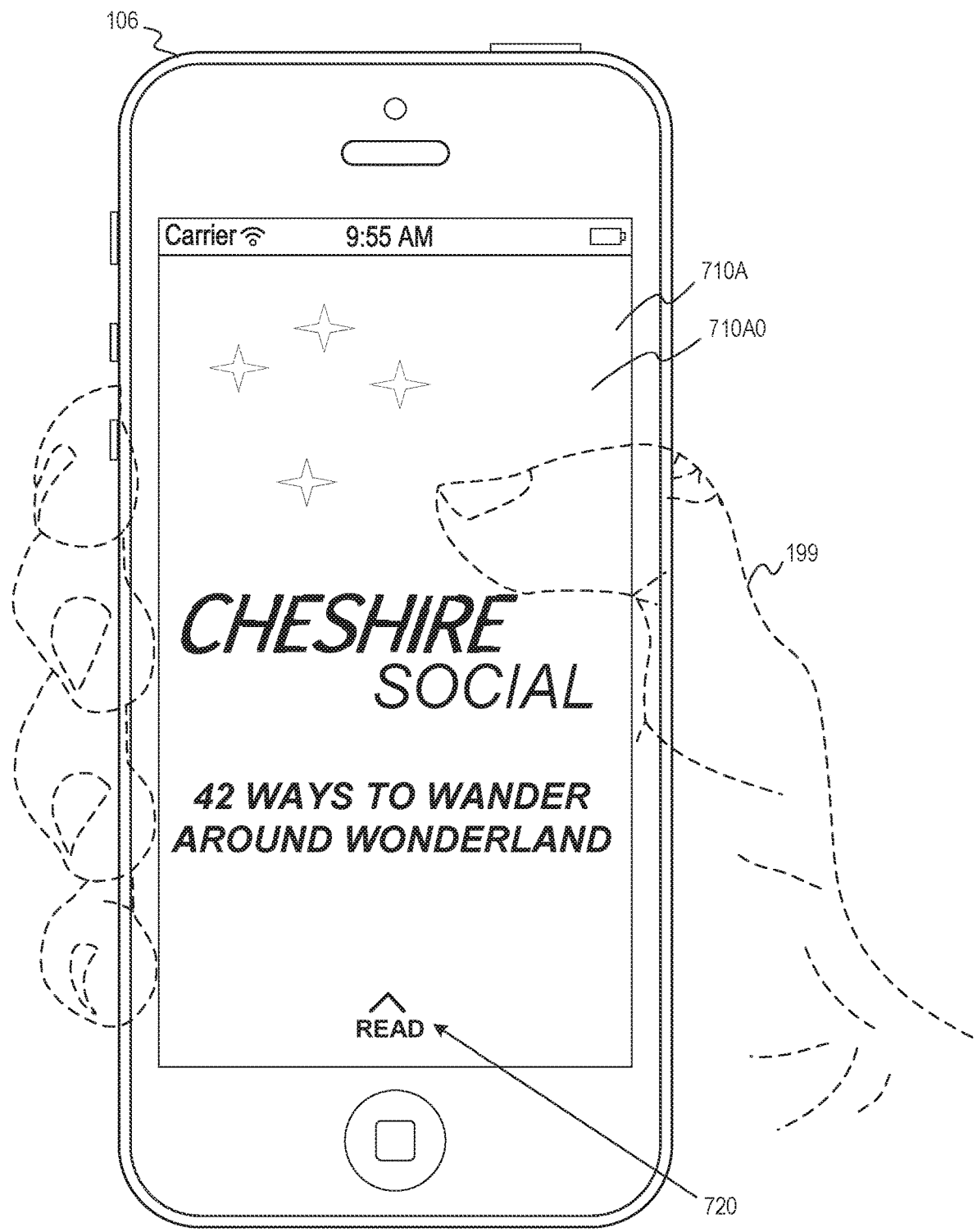

Continuing, assuming user 199 selects icon 777A, the interface engine 200 will receive an indication from client device 106 that the user 199 has made a selection of the icon 777A, which will trigger the post series engine 210 to retrieve the electronic document corresponding to icon 777A and cause the display engine 205 to display the electronic document as illustrated in FIG. 7B.

FIG. 7B illustrates an electronic document corresponding to icon 777A. In particular, a top portion 710A0 of the electronic document 710A is initially displayed when the electronic document 710A is selected by user 199. Electronic document 710A is a multipart document, some portions on-screen and some portions off-screen, as according to some example embodiments. In FIG. 7B, the top portion of 710A is visible and on-screen, and other parts (e.g., 710A1, and 710A2) of electronic document 710A, are off-screen but are displayed in the following figures when navigated to, as according to some example embodiments.

In some example embodiments, each portion (e.g., 710A0, 710A1, and 710A2) of the electronic document 710A fills the entire the area of a primary application interface area 111 (e.g., an area of the touchscreen display 700 where the running application is displayed, excluding the status bar along the top). The top portion 710A0 of the interface includes a title, descriptive text, and an action element 720, according to an example embodiment. The action element 720, in some example embodiments, is a non-active element of the multi-portion electronic document. The action element 720 may not be linked or associated with a control object but rather includes instructions that the user 199 may use to navigate through the multi-portion electronic document.

Figure 7C:
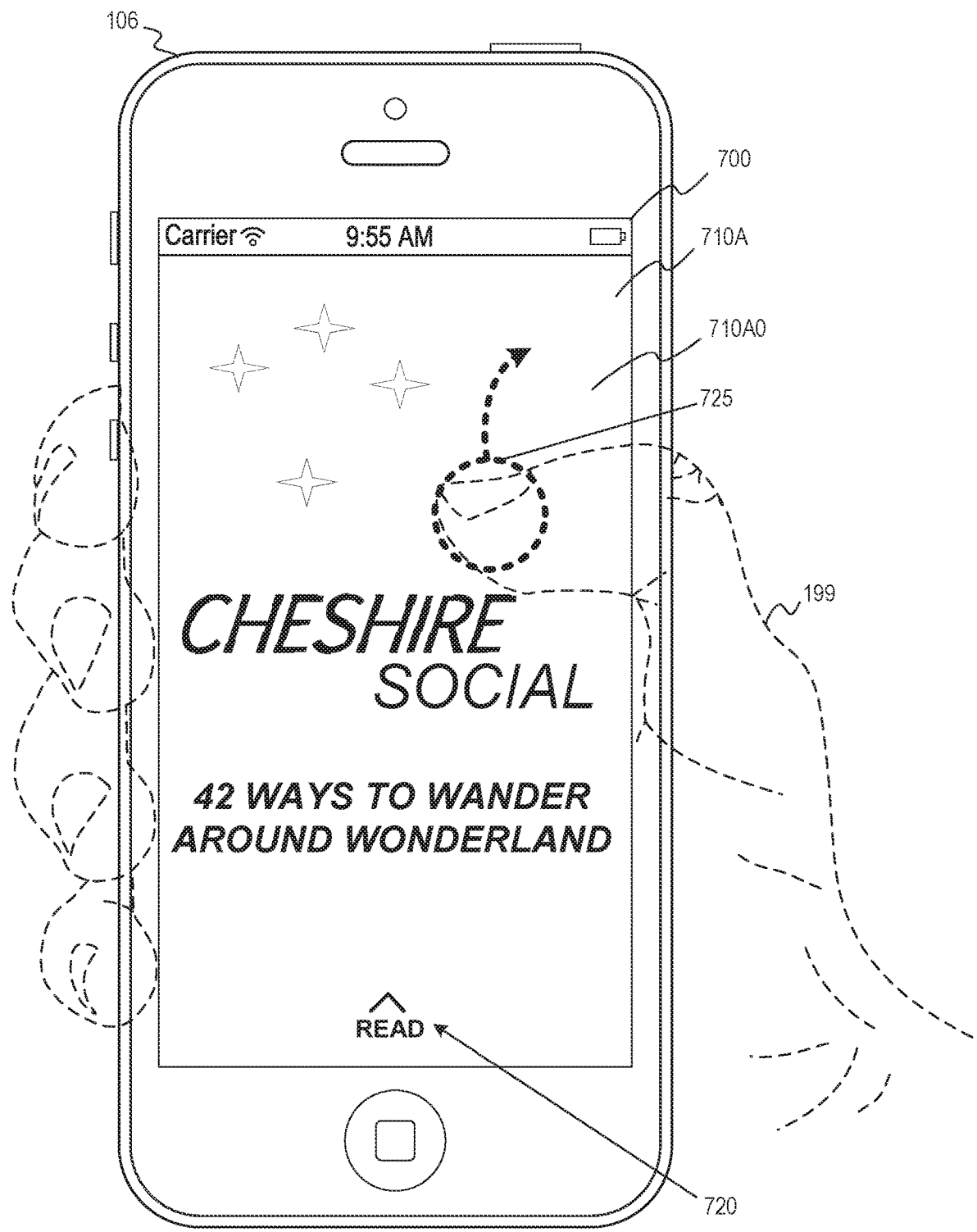

FIG. 7C illustrates a user 199 making a swipe-up gesture through the touchscreen display 700, as indicated by gesture indicator 725. The gesture indicator 725 is illustrated to show that the direction of the gesture is not necessarily included or displayed on the touchscreen display 700. In some example embodiments, the interface engine 200 or the client device 106 has configured logic to determine whether a display gesture is along the axis of navigation, e.g., whether the gesture is up, approximately up, or not up, based on an angle threshold. For example, a gesture beyond an angle threshold of 45 degrees may not be counted as being an up swipe or an up gesture.

Figure 7D:
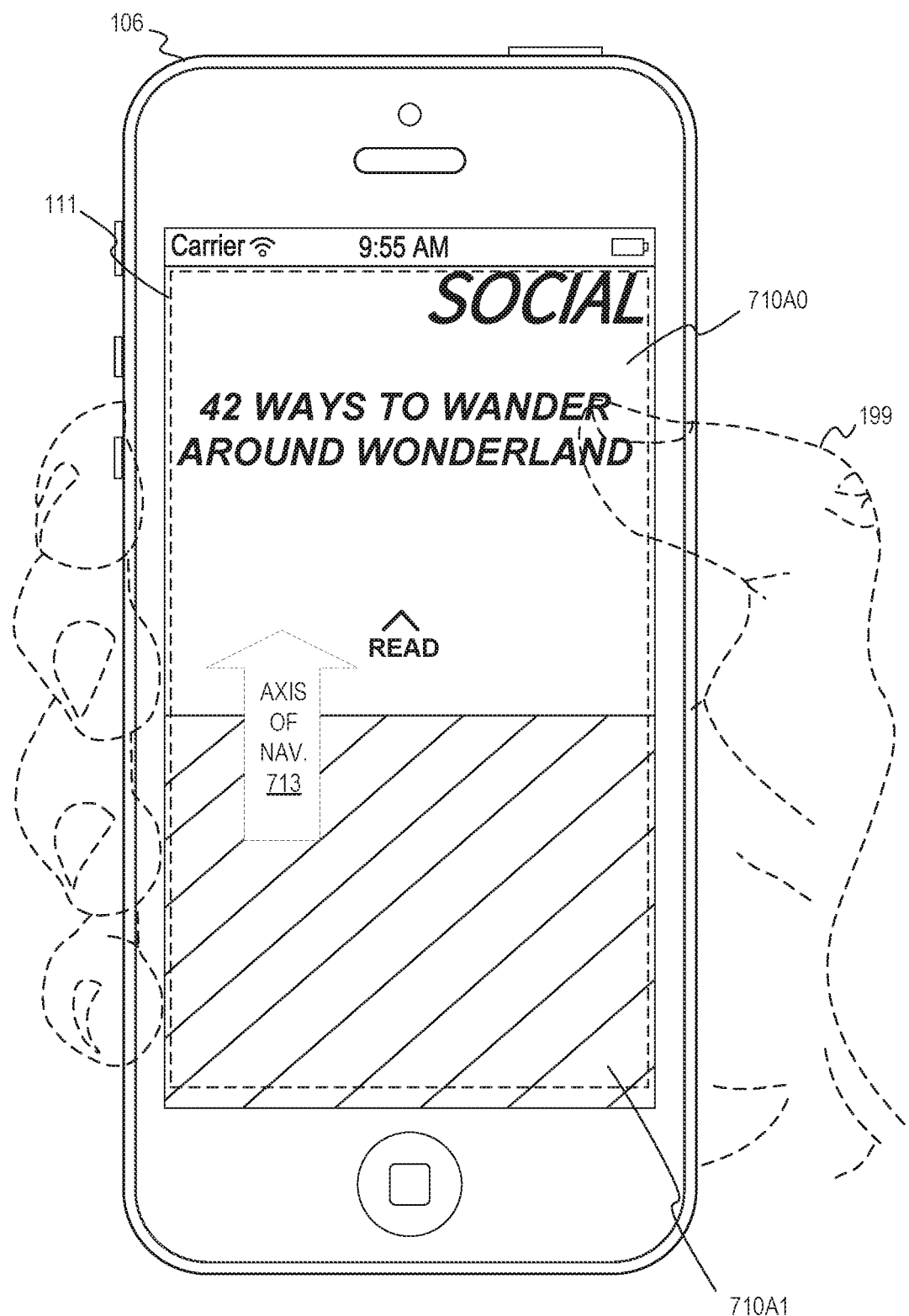

FIG. 7D shows the post series client application 110 navigating from the top portion 710A0 of the electronic document to the first portion 710A1 of the electronic document. The swipe received as indicated by gesture indicator 725 in FIG. 7C was along the axis of navigation 713 relative to the top portion 710A0 and the first portion 710A1; that is, in the up-down or vertical axis. The axis of navigation is displayed as an upward arrow corresponding to an example embodiment where the reader swipes up, with respect to the primary application display area 111, and the top portion 710A0 scrolls up out of view as the first portion 710A1 scrolls up into view, from the bottom of the primary application display area 111.

Figure 7E:
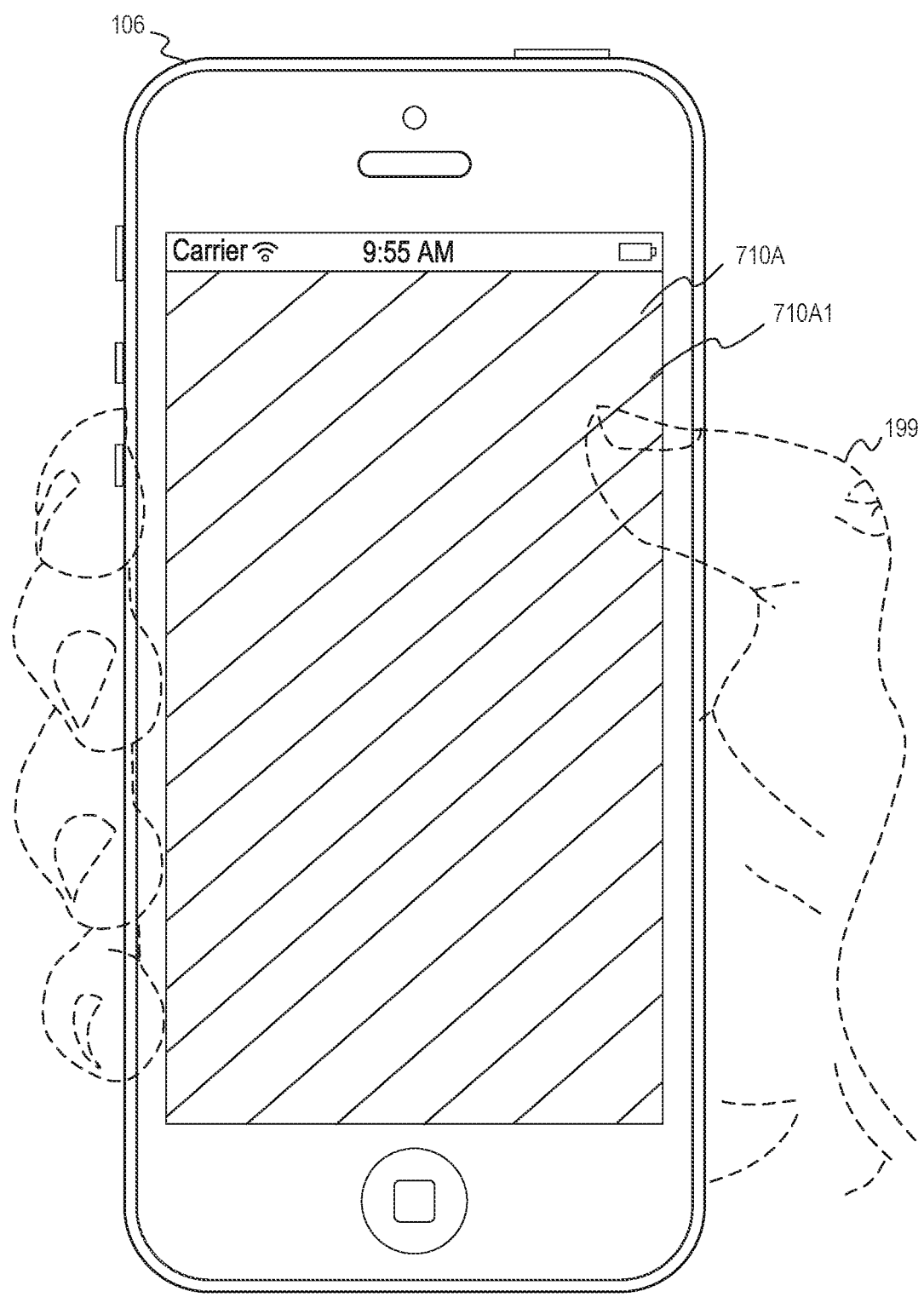
Figure 7F:
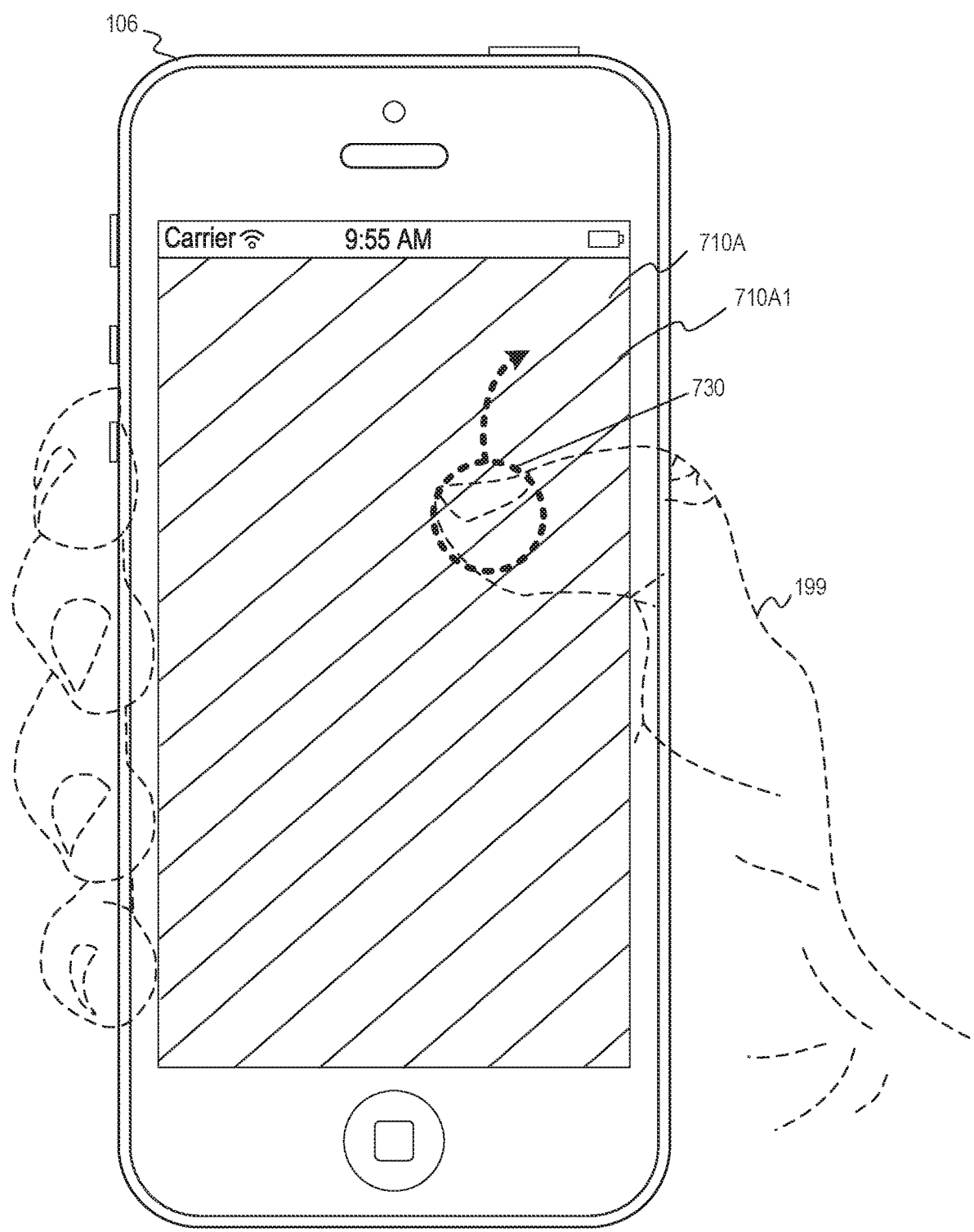

FIG. 7E illustrates the post series client application 110 displaying the first portion 710A1 of the electronic document corresponding to icon 777A. Similar to the top portion 710A0, the first portion 710A1 can also fill the entirety of the primary application display area 111 for client device 106. FIG. 7F shows user 199 performing a second gesture 730 on the first portion 710A1 of the electronic document.

Figure 7G:
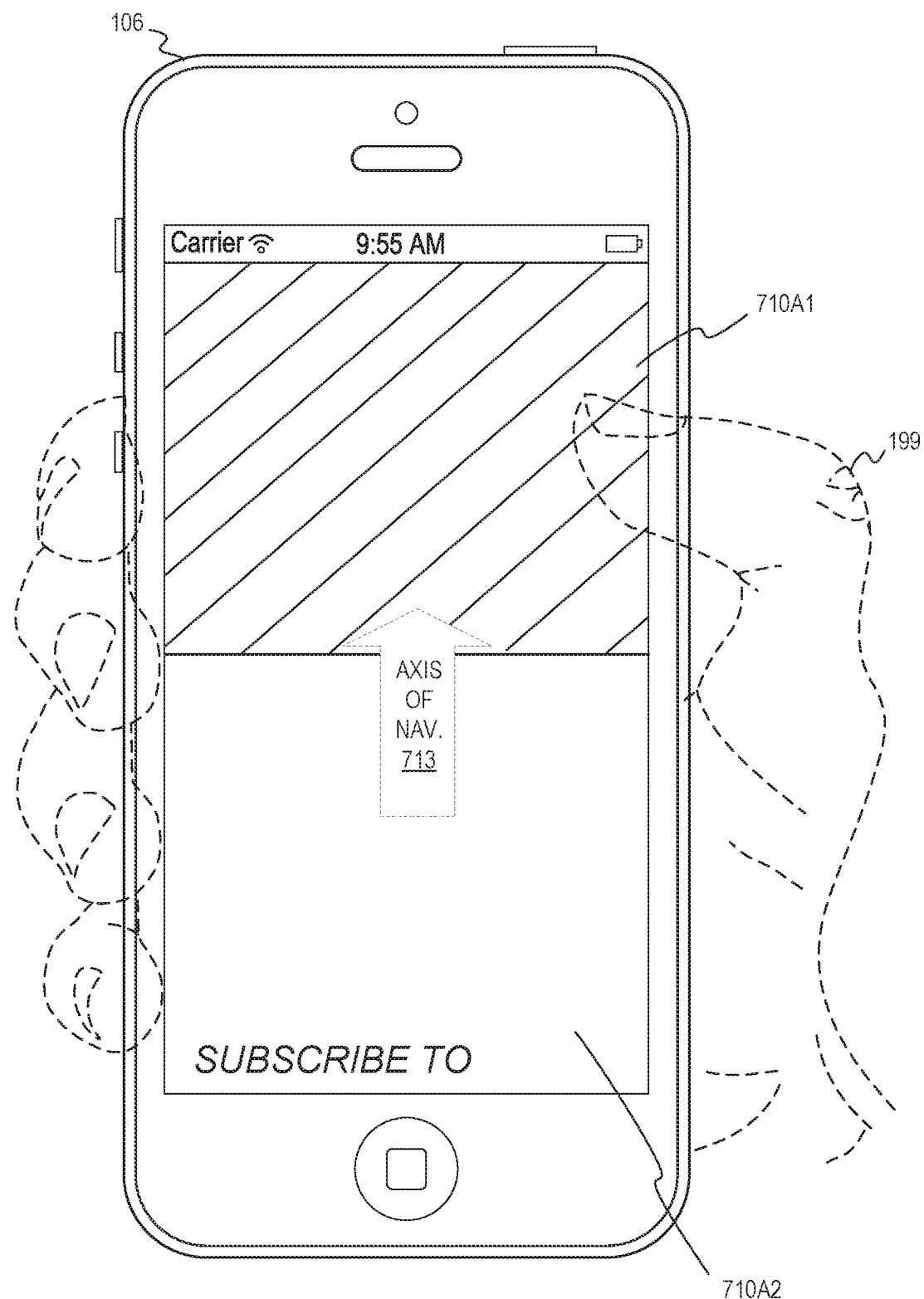
Figure 7H:
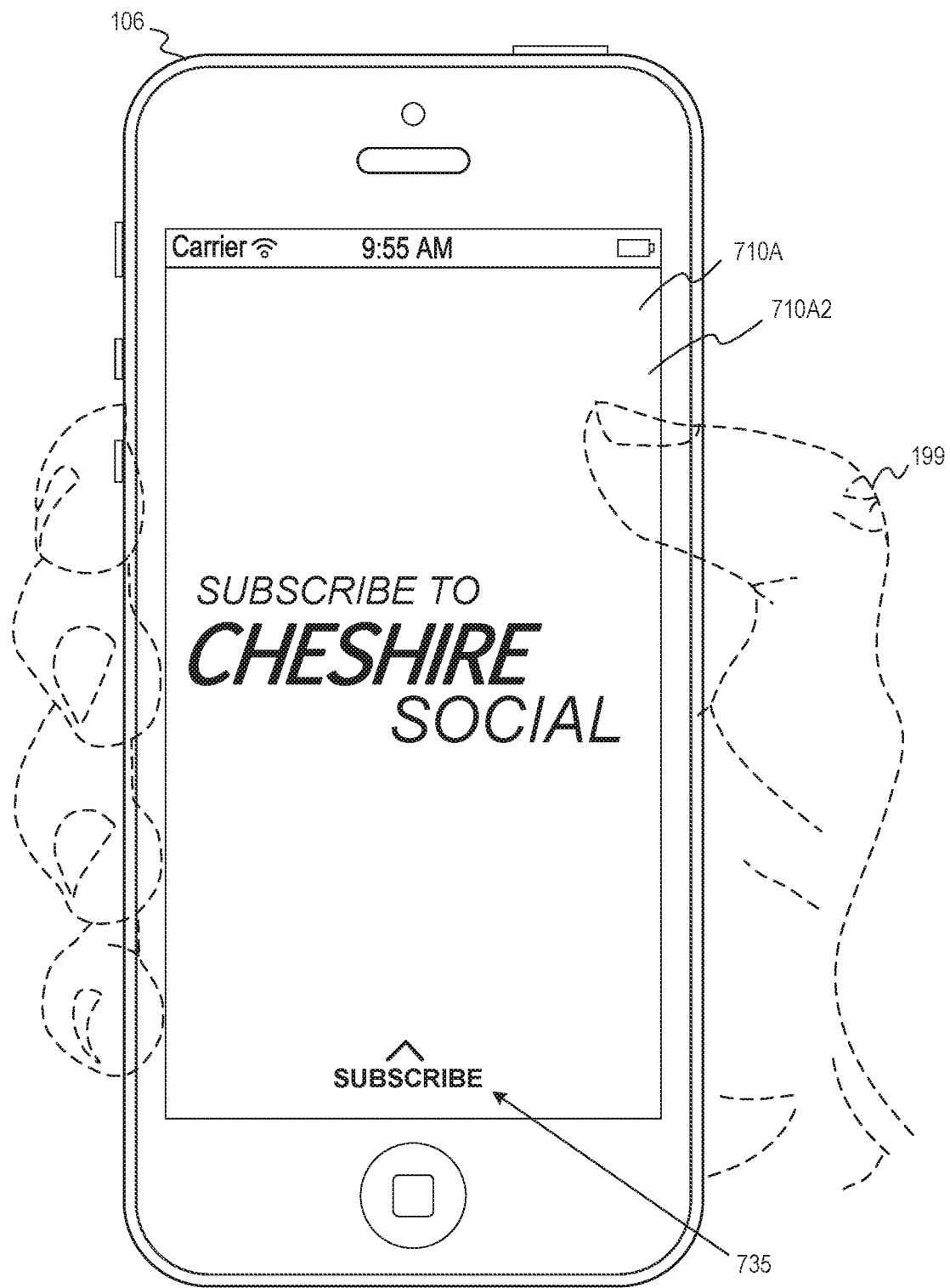

FIG. 7G illustrates the transition along the axis of navigation 713 relative to the first portion 710A1 and a second portion 710A2 of the electronic document. FIG. 7H illustrates the post series client application 110 displaying the second portion 710A2 of the electronic document. As illustrated, the second portion 710A2 may also fill the entirety of the primary application display area 111 for the post series client application 110. The second portion 710A2 includes an action element 735. The action element 735 may be an indicator of interactions options that the user 199 can perform when the second portion 710A2 is displayed, though it is appreciated that the interaction options can be indicated from touching on any portion of the second portion 710A2. For example, as explained with reference to FIG. 5, when the second portion. 710A2 is displayed, a trigger is activated at operation 505 after which the trigger engine 215 may receive notification of any gesture anywhere in second portion 710A2, not necessarily directly on the action element 735.

Figure 7I:
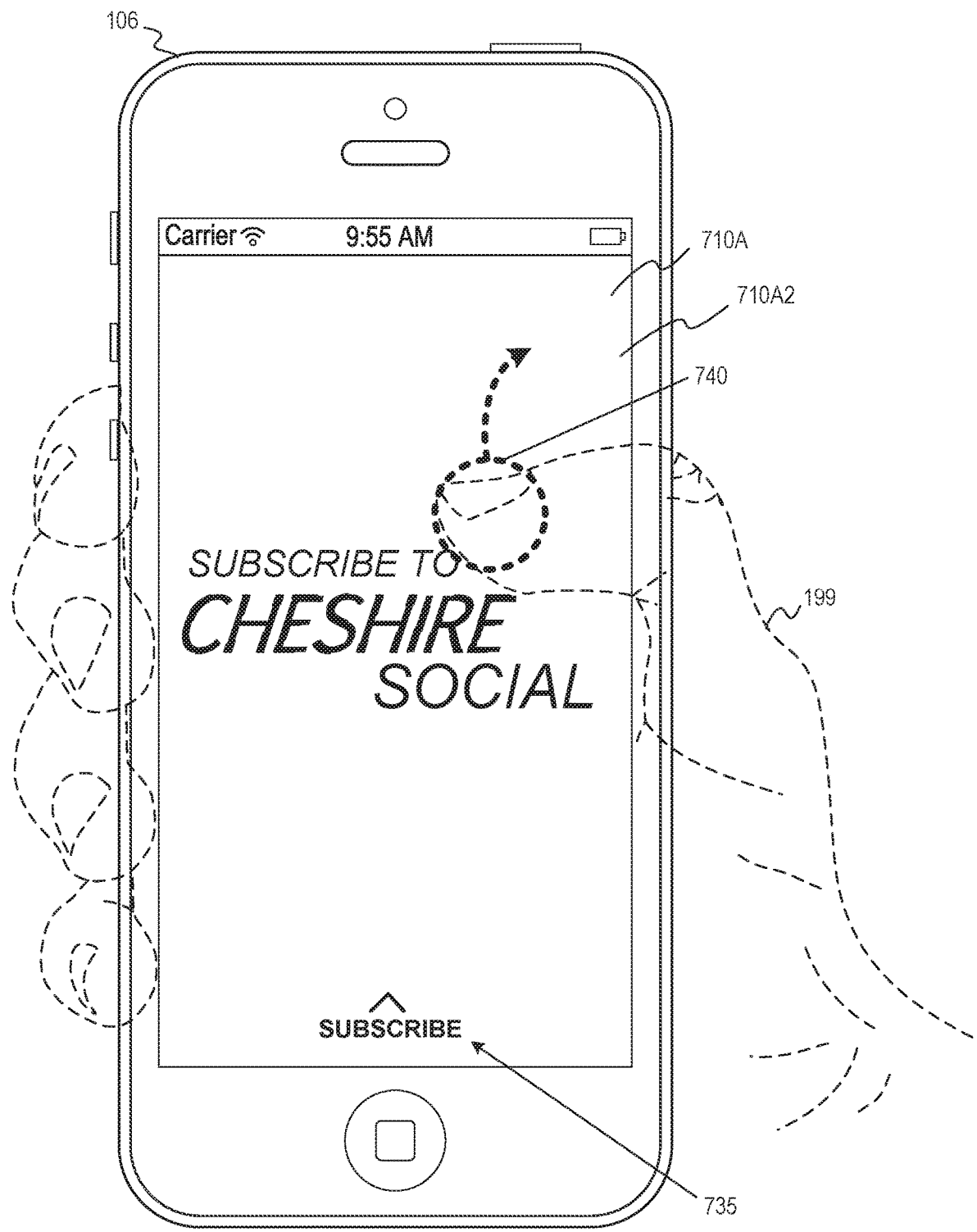
Figure 7J:
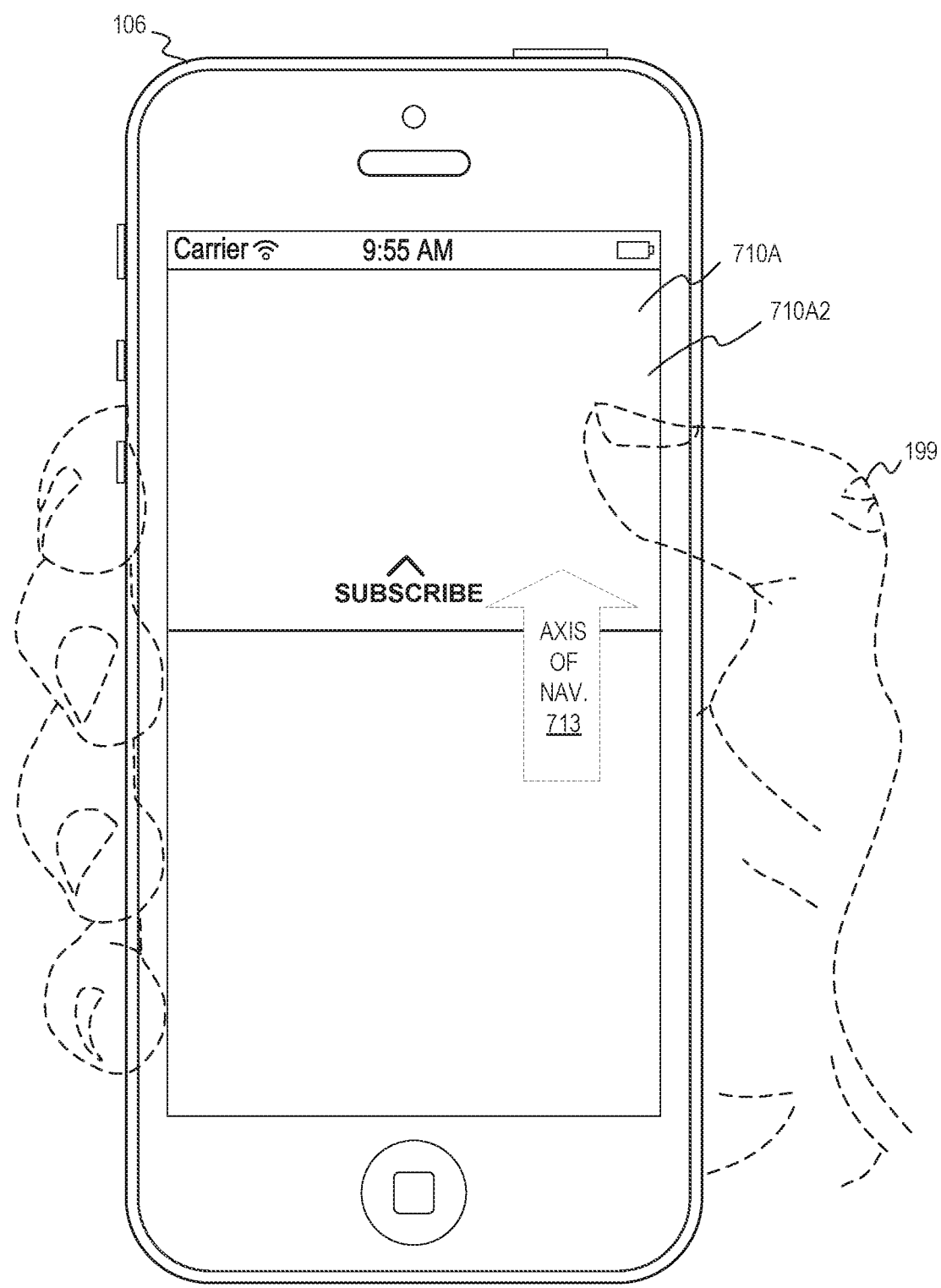
Figure 7K:
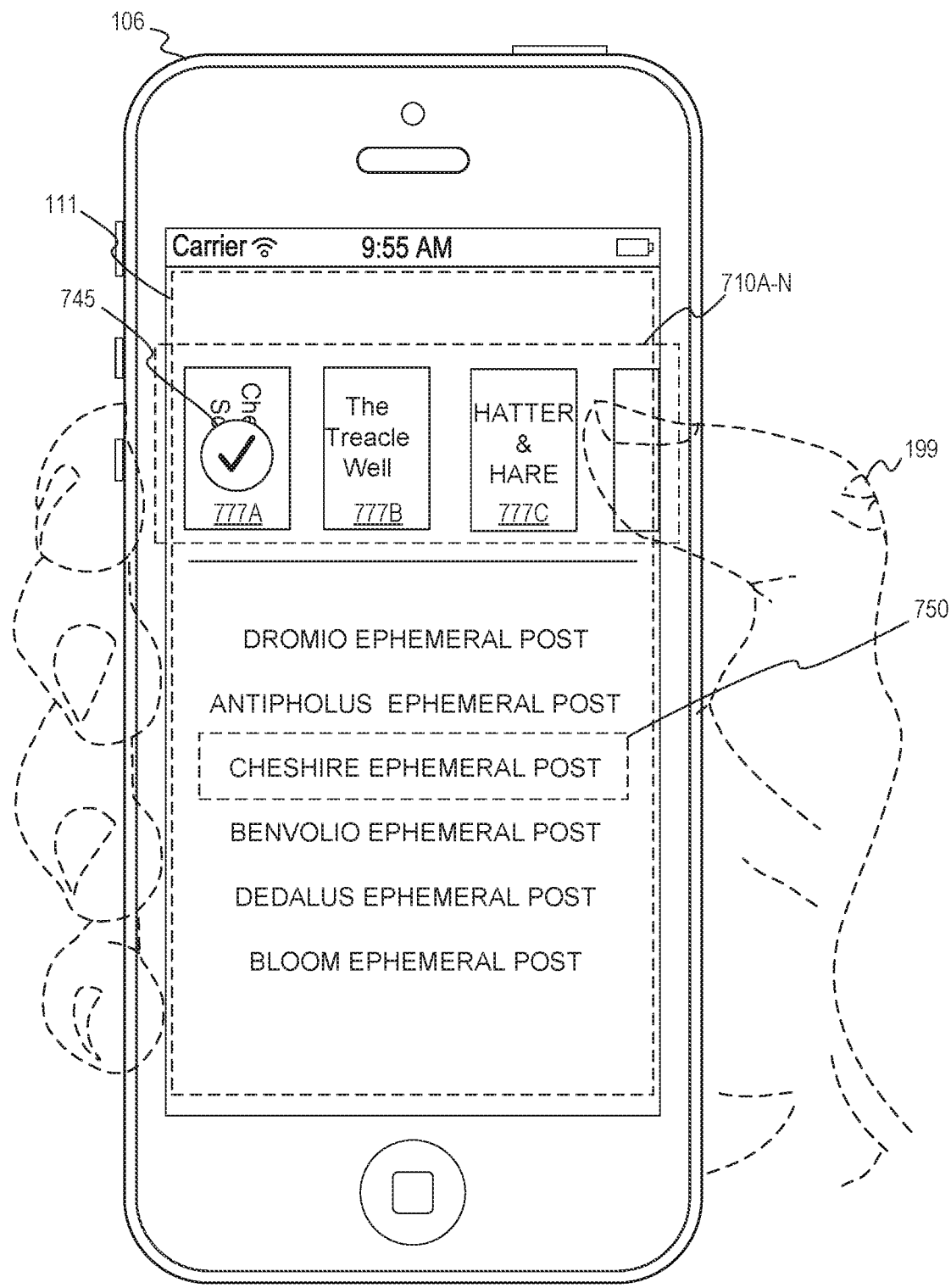

FIG. 7I illustrates the user 199 making an upward swipe display gesture 740 on the second portion 710A2. As illustrated, the gesture 740 is along the axis of navigation 713. FIG. 7J displays the actions responsive to display gesture 740. In particular, responsive to gesture 740, the interface of the electronic document including the top portion 710A0, first portion 710A1, and second portion 710A2 is collapsed, fades-out, or otherwise returns to a display of the home screen of post series client application 110. FIG. 7K shows a return to the home screen of post series client application 110.

The subscription operation is then sent out before, after, and/or during the transition from the second portion 710A2 to the home screen, as according to some example embodiments. As illustrated in FIG. 7K, a notification icon 745 may be overlaid on icon 777A to indicate to user 199 that the subscription request has been submitted and the user 199 has subscribed to the series of documents identified as "Cheshire Social" or another identifier value that identifies "Cheshire Social series of posts. In some example embodiments, where network connectivity is low or zero, the notification icon 745 may still be displayed to show the user 199 the subscription request has been triggered. When client device 106 is able to connect to network 102, the subscription request may be transmitted to application server 118.

Further, responsive to the subscription request being received, the subscribed-to series may be placed in first (e.g., left most) among the plurality of electronic document icons 777A-C in display area 707. Further, responsive to the subscription request, the post series client application 110 may receive pushes from ephemeral posts of the series. For example, as illustrated, the "Cheshire Ephemeral Post" 750 is associated with the series posts and may be automatically displayed in the ephemeral display area 715.

Figure 8:
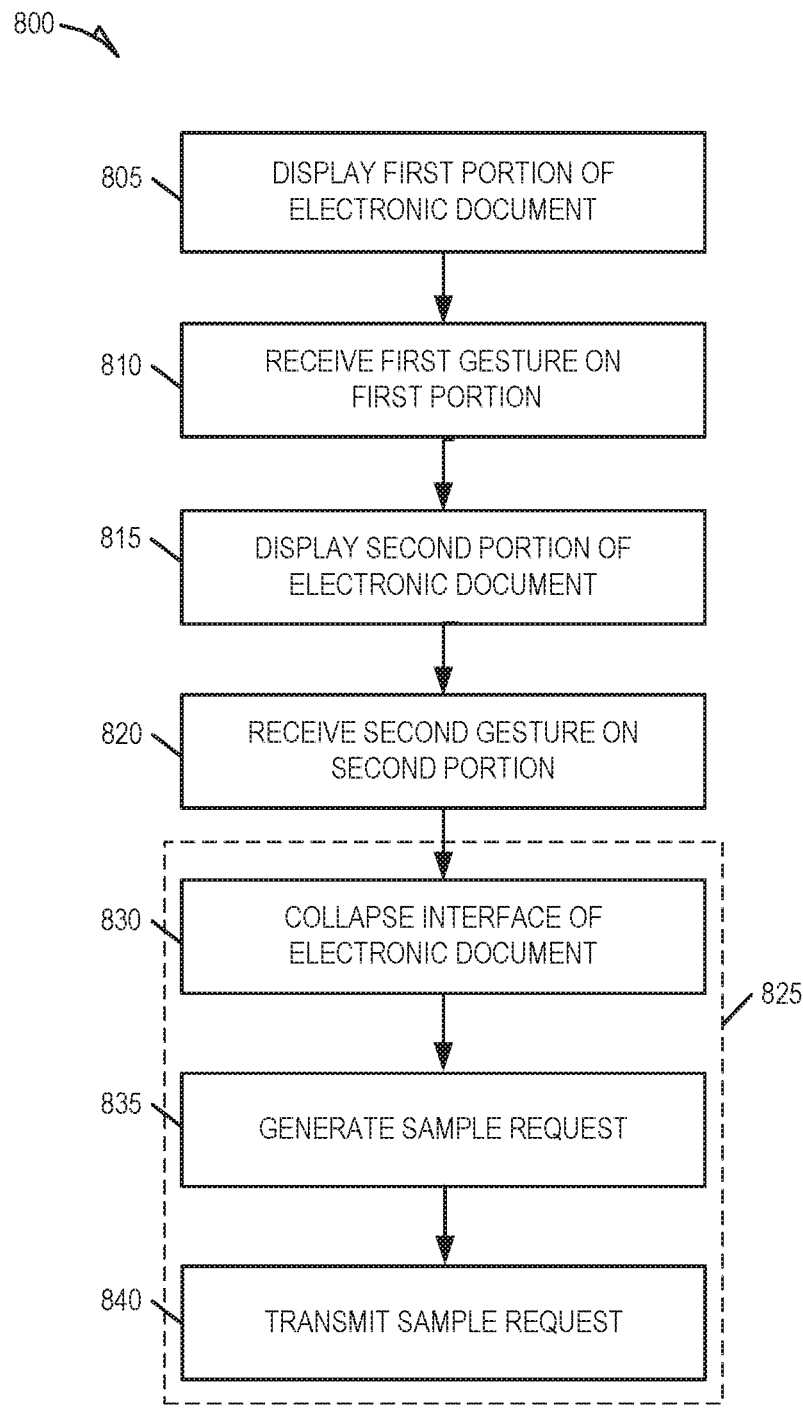
FIG. 8 is a flow diagram illustrating an example method for using a gesture based trigger in a sample request process, according to some example embodiments.

The modification trigger may also be used to collapse an electronic document and perform other actions via the action engine 220, such as ordering a sample of an item discussed in an electronic document, as according to an example embodiment. FIG. 8 shows a flowchart for a method 800 of performing a sample request for an item using a modification trigger, as according to some example embodiments. At operation 805, the display engine 205 displays a first portion (e.g., the first portion 710A1) of the electronic document. At operation 810, the interface engine 200 receives an indication (e.g., via operating system of client device 106) that a first gesture has been made on the first portion. At operation 815, the display engine 205 displays the second portion (e.g., the second portion 710A2) of the electronic document. At operation 820, the interface engine 200 receives an indication that a second gesture on the second portion has been received. Operation 825 is a multi-part trigger operation including operations 830, 835, and 840. Operation 825 may be performed using the methods of FIG. 4 or FIG. 5.

Continuing, at operation 830, the display engine 205 collapses the interface of the electronic document, for example by removing from the touchscreen display 700 a viewing of the first, second or any other portion of the displayed electronic document. At operation 835, the action engine 220 receives from the trigger engine 215 an indication that the trigger has been executed. For example, the trigger engine 215 references a specific function managed by the action engine 220. Accordingly, at operation 835, the action engine 220 executes the content of the function and generates a sample request for an item discussed in the electronic document. At operation 840, the action engine 220 transmits, via the interface engine 200, the sample request through the network 102 for fulfillment processing by the electronic post publication system 124 and/or the third party server 108.

Figure 9:
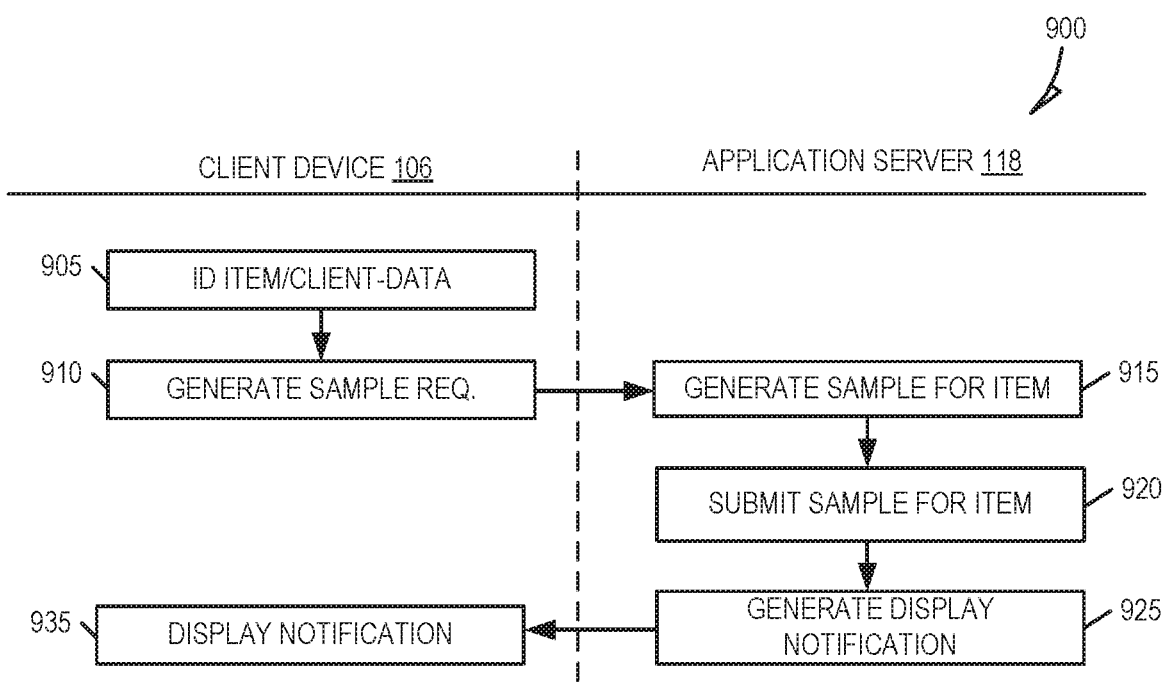
FIG. 9 is an interaction diagram illustrating network interactions between a client device and an application server, according to example embodiments.

FIG. 9 shows an interaction diagram of a method 900 for interactions between the client device 106 and the application server 118. Although the client device 106 and application server 118 are illustrated in FIG. 9, it is appreciated that the client device 106 may perform its corresponding actions of FIG. 9 through post series client application 110, and further that the application server 118 may perform its corresponding actions of FIG. 9 through the electronic post publication system 124. Additionally, the operations of FIG. 9 may be initiated by the action engine 220. For example, at operation 905, the action engine 220 identifies the item requested or the sample requested from the electronic document. In some example embodiments, the action engine 220 may request item metadata from the displayed electronic document that identifies the item to be ordered. Further, the action engine 220 may also retrieve other information for completing the order, such as user information, payment information, shipping information.

At operation 910, the action engine 220 generates an order or sample request. At operation 915, the application server 118 receives the sample request for the item. At operation 920, the application server 118 may transmit a sample request to an order completion system that clears the payment using user payment information and submits an item order. In some example embodiments, the clearing of the payment transaction is performed by the third party server 108 using payment information provided by the application server 118. In some example embodiments, the application server 118 is configured to clear payments internally within the network-based publishing system 104 using payment information received from the client device 106. For example, the client device 106 may be part of an application marketplace or app store. The application server 118 may have pre-approved authority from the user 199 to complete transactions using the payment information of user 199. Once the order has been submitted by the application server 118, the application server 118 generates a display notification at operation 925. At operation 935, the client device 106 receives the display notification and displays the notification on the display device, e.g., touchscreen display 700, of the client device 106.

Figure 10A:
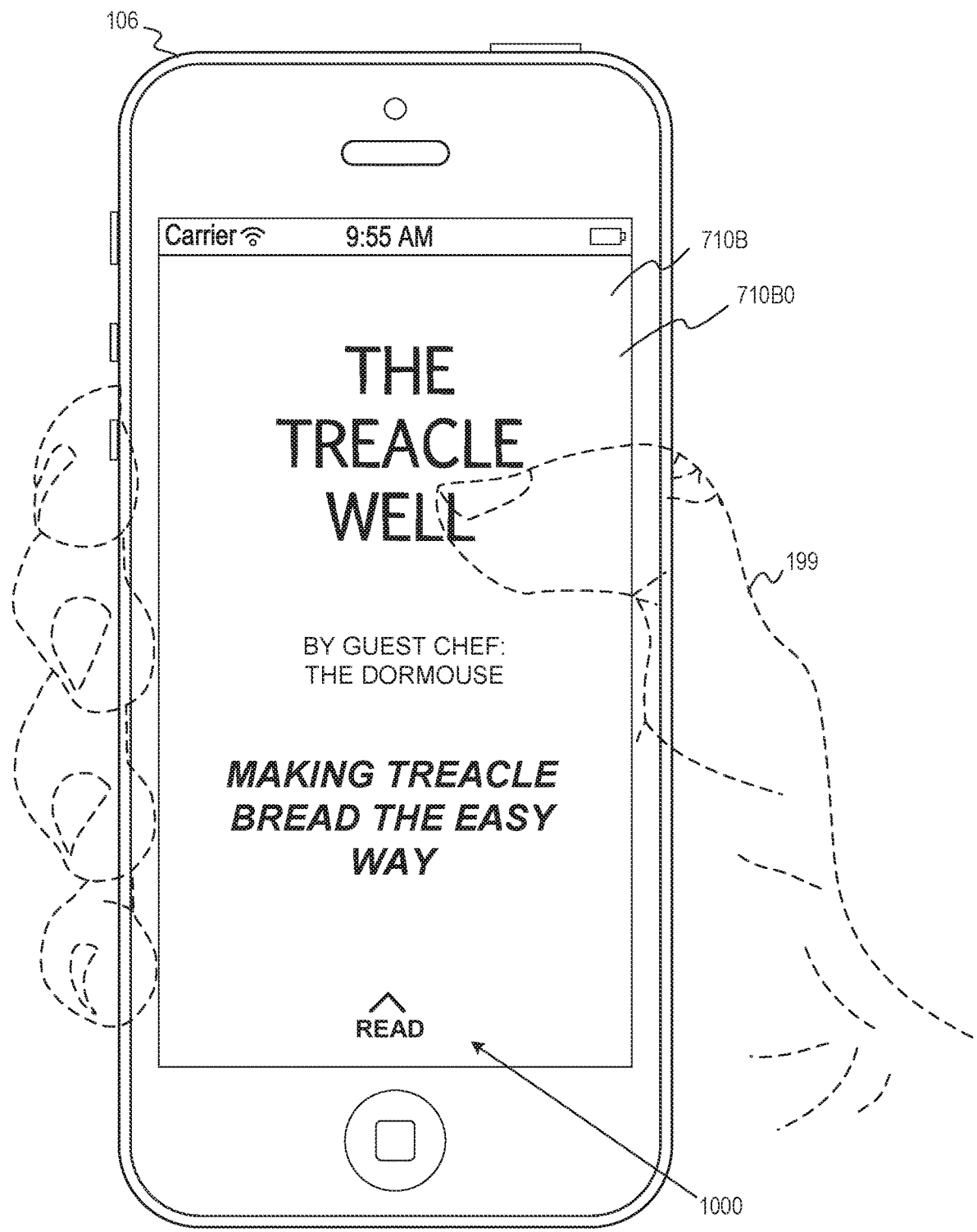
FIGS. 10A-I show user interfaces illustrating use of a gesture based trigger, according to example embodiments.

FIGS. 10A-4 illustrate interfaces of post series client application 110 for performing a sample item request using a modification trigger, according to some example embodiments. FIG. 10A illustrates a top portion 710B0 of the electronic document corresponding to icon 777B being displayed on the touchscreen display 700 of client device 106. Like the electronic document corresponding to icon 777A, this electronic document includes multiple portions, including the top portion 710B0, which is above a first portion 710B1 (see FIG. 10C), which is above a second portion 710B2 (see FIG. 10F). The top portion 710B0 may have an action element 1000 that indicates to the user 199 an available action that can be performed by selecting the top portion 710B and performing one or more gestures (e.g., swiping in an indicated direction) while viewing the top portion 710B0.

Figure 10B:
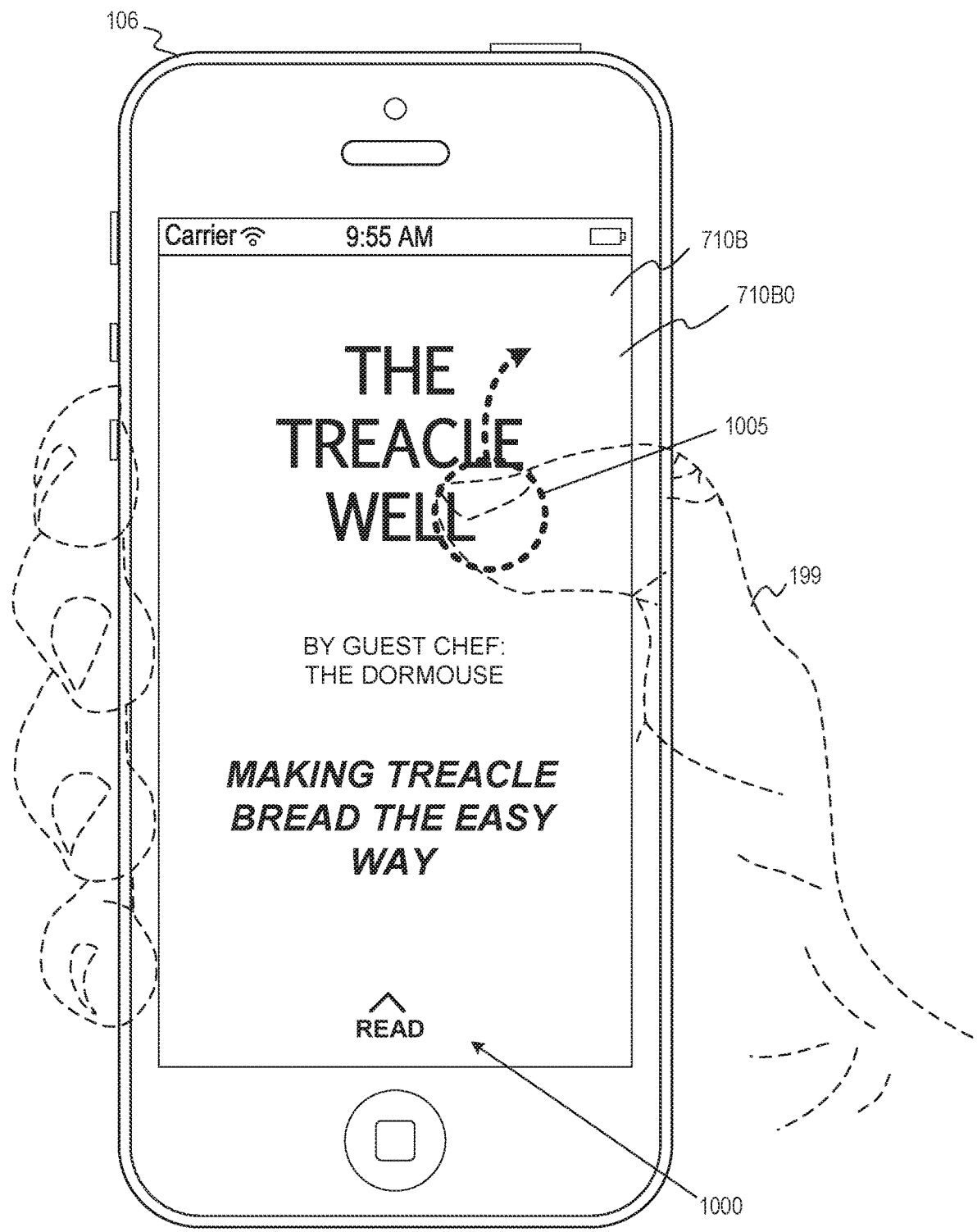
Figure 10C:
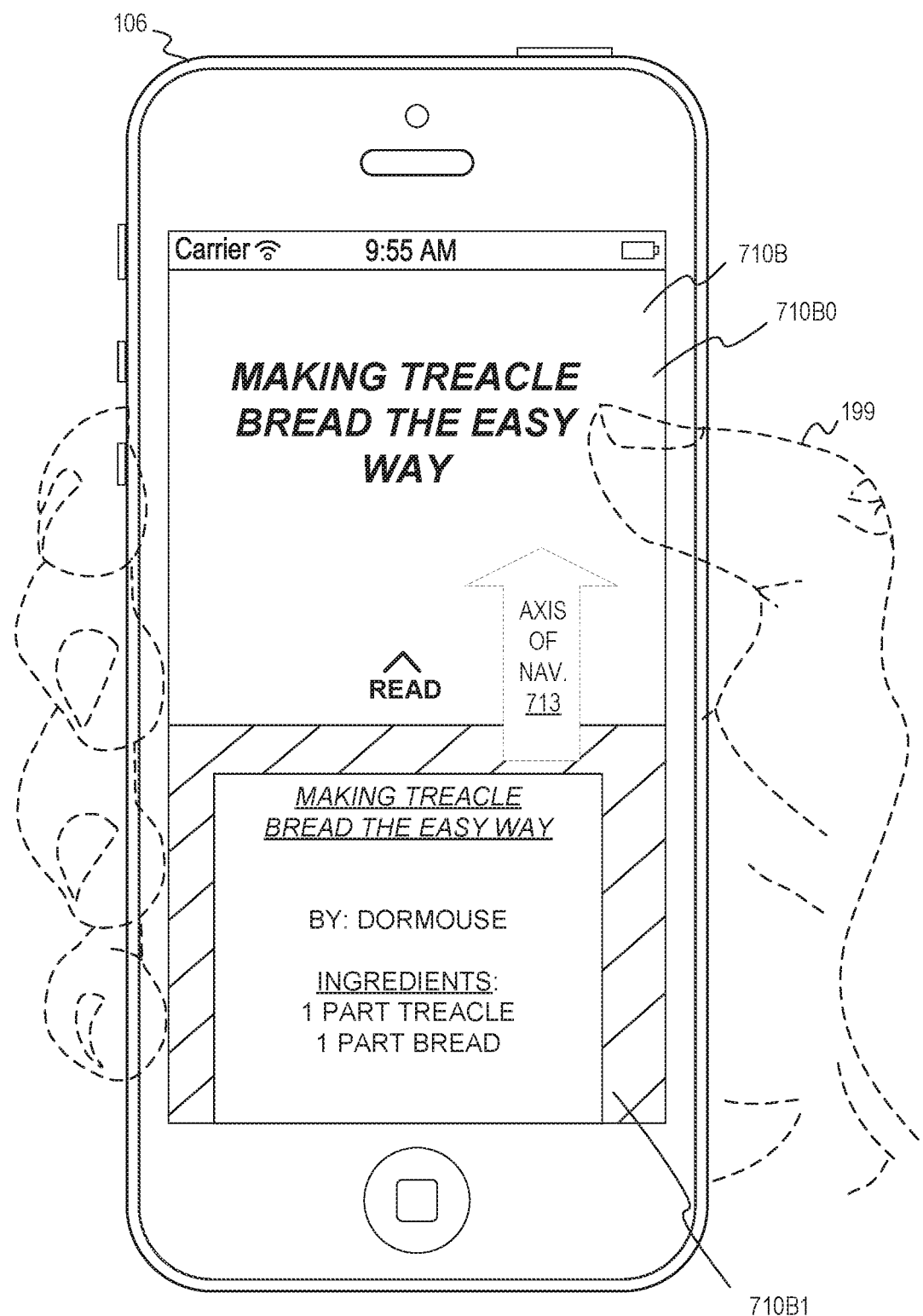
Figure 10D:
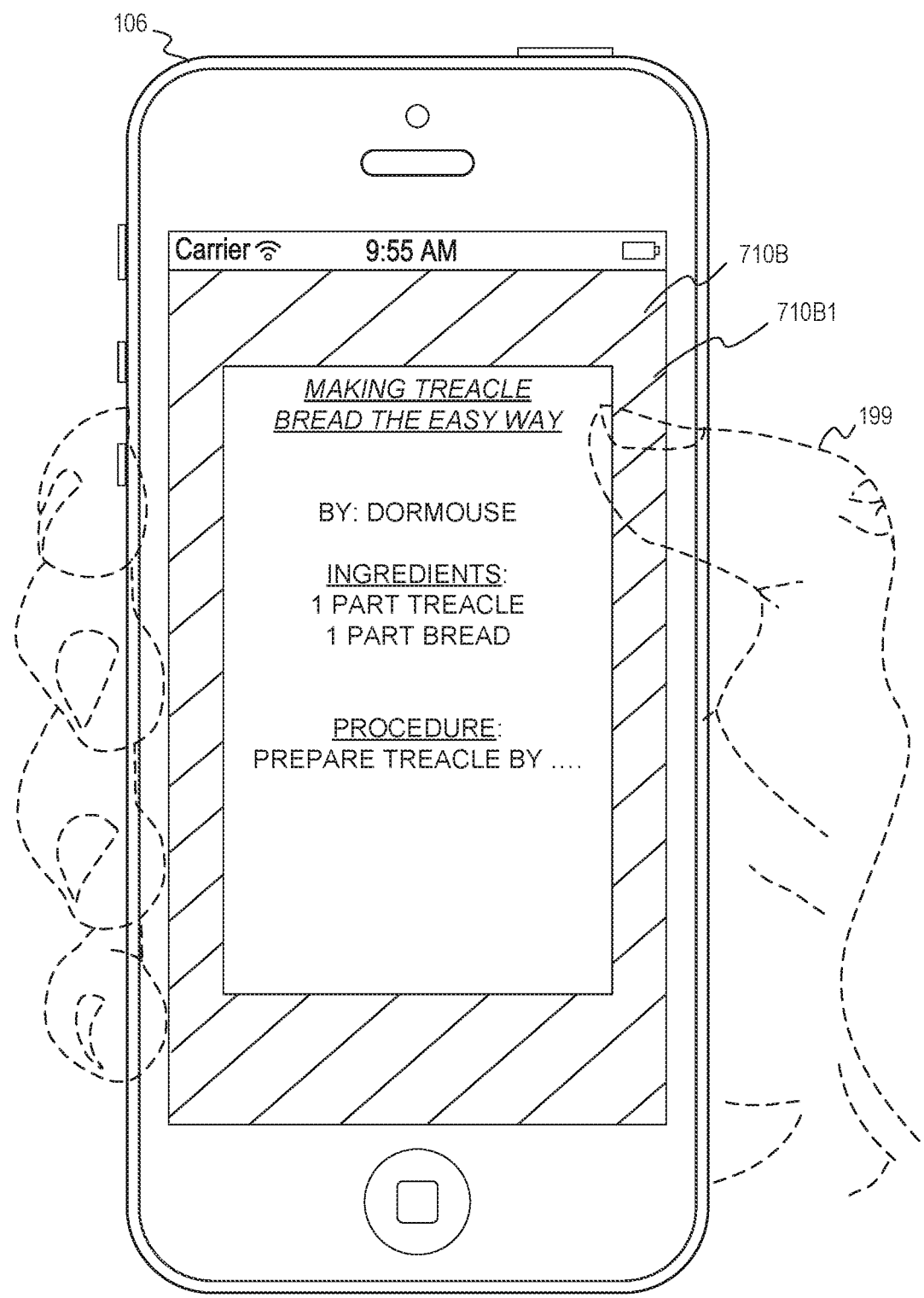

FIG. 10B illustrates the user 199 performing a gesture 1005 in an upward direction. FIG. 10C illustrates a transition between displaying the top portion 710B0 and the first portion 710B1 along the axis of navigation 713. FIG. 10D illustrates the first portion 710B1 occupying the entire screen area of the electronic document as displayed within post series client application 110. Notably, although the middle portion or first portion 710B1 does not display an action element such as action element 720 or action element 1000, one of ordinary skill in the art appreciates that such an action element could be placed within any portion of the electronic document to indicate to a user how to navigate through the document.

Figure 10E:
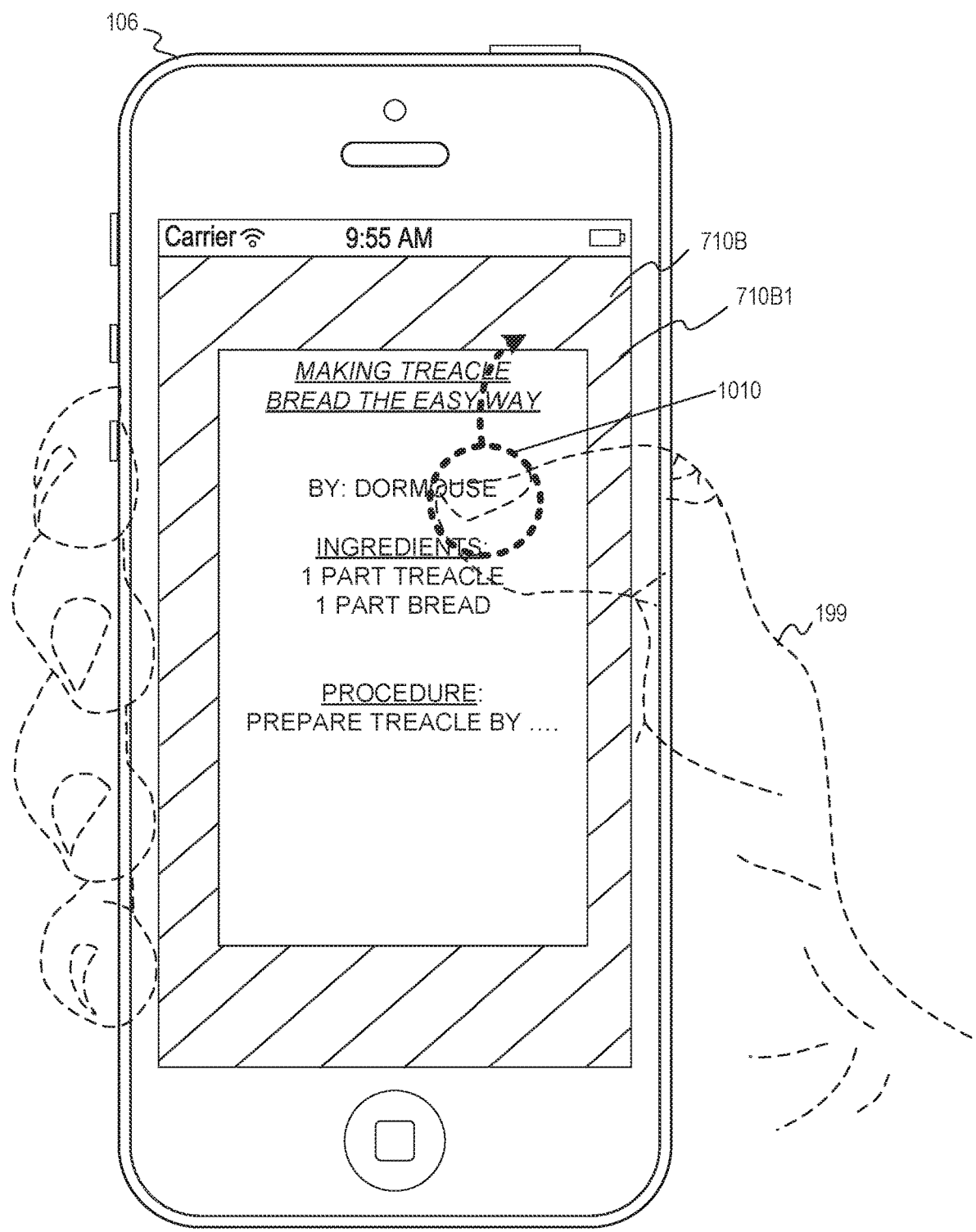
Figure 10F:
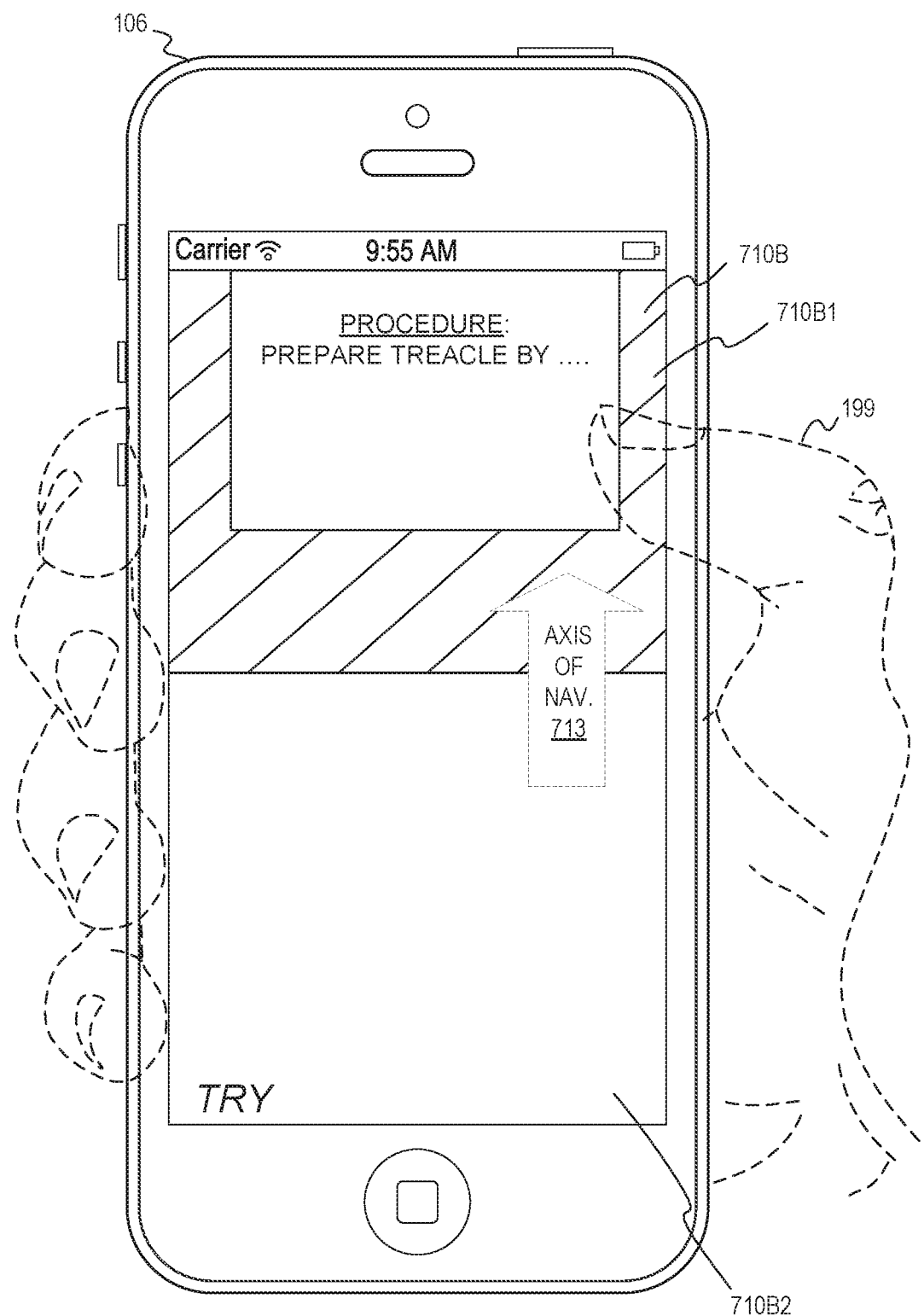
Figure 10G:
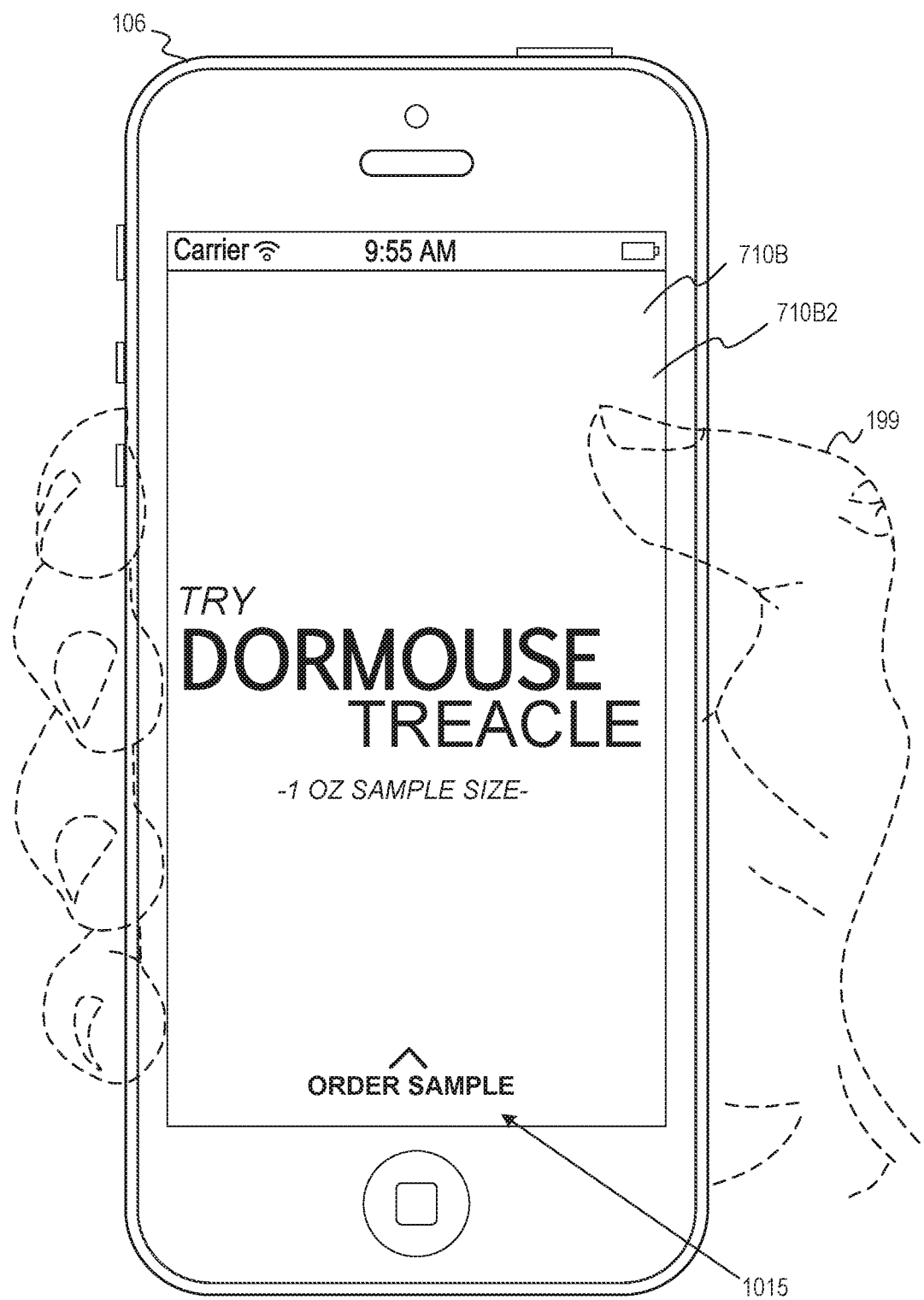

FIG. 10E illustrates the user 199 executing a display gesture 1010. FIG. 10F illustrates the post series client application 110 transitioning between the first portion 710B1 and second portion 710B2 along the axis of navigation 713. FIG. 10G illustrates the second portion 710B2 of the electronic document corresponding to icon 777B. In contrast with the second portion 710A2 displayed in FIG. 7H, the action element 1015 in the second portion 710B2 indicates that user 199 will execute a modification trigger to automatically submit an order for the item mentioned in the electronic document (e.g., Dormouse Treacle, Sample Size 1 Oz).

Figure 10H:
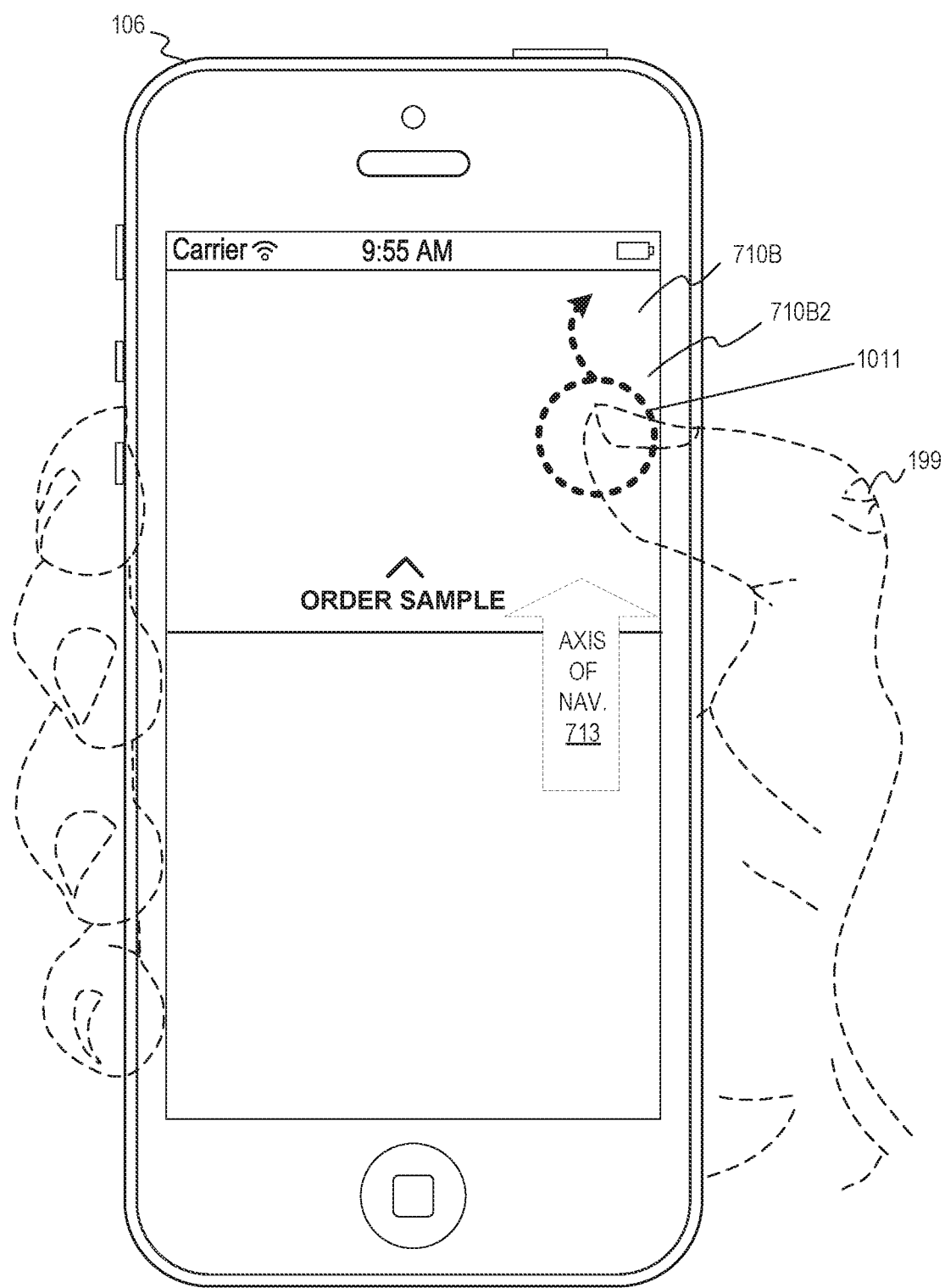

FIG. 10H illustrates the user 199 executing a display gesture 1011 to collapse the interface of the electronic document. As illustrated, in some example embodiments, collapsing the interface of the electronic document is completed by giving the appearance that the second portion 710B2 is scrolling midway upward through the primary application display area 111 of the post client series application 110, then collapsing or minimizing the interface of the electronic document to its corresponding icon 777B on the home screen of the post series client application 110.

Figure 10I:
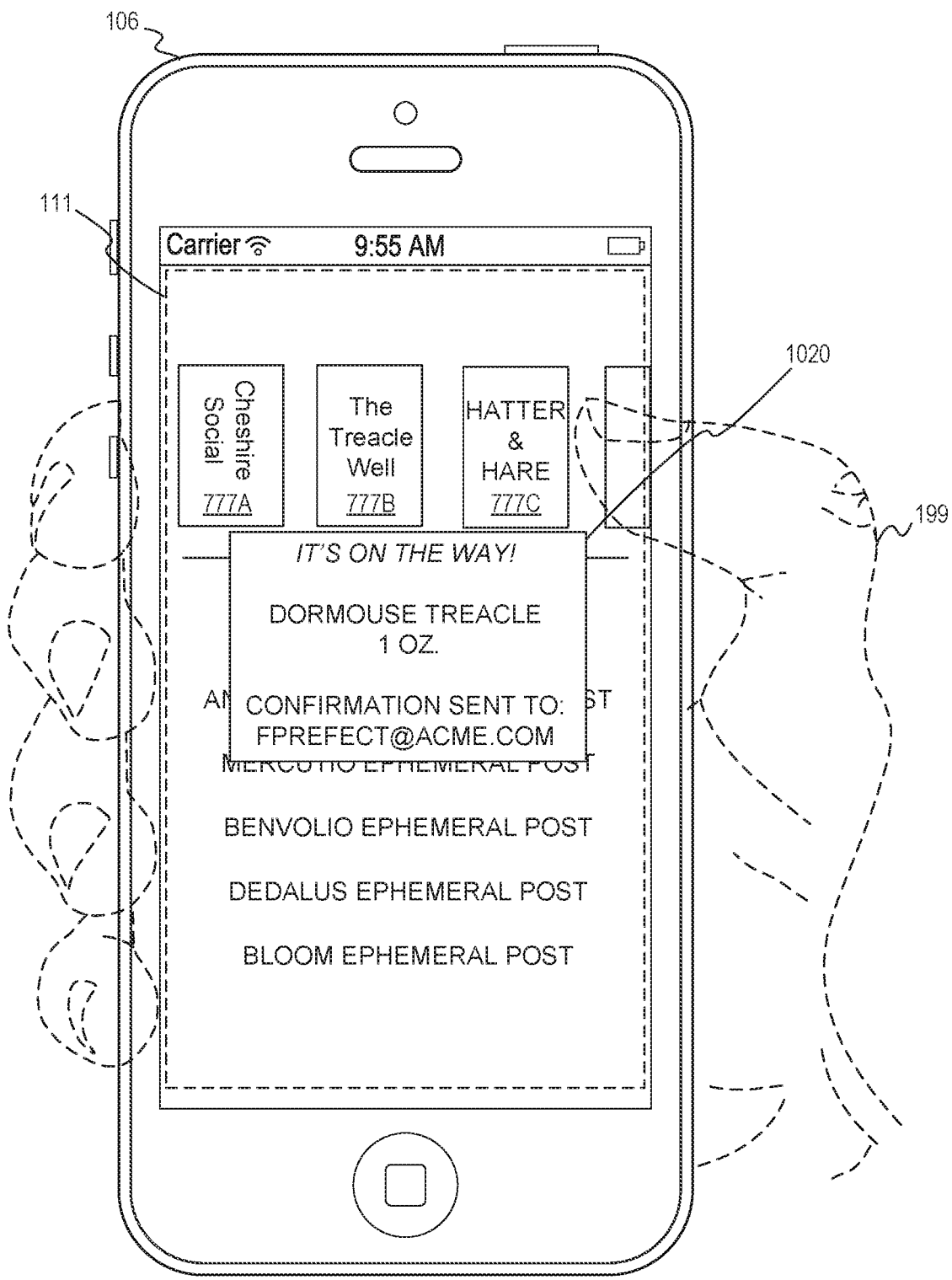

FIG. 10I illustrates an example result of the collapse operation, as according to an example embodiment. As illustrated in FIG. 10I, the home screen of the post series client application 110 is displayed, and responsive to the modification trigger submitting the request for the sample, a overlay notification is displayed as notice 1020. The notice 1020 corresponds to operation 935 of FIG. 9. Further notifications may include confirmation emits being sent from the application server 118 to an email account of user 199.

Though three example portions of an electronic document are disclosed here for purposes of explanation, it is appreciated that an electronic document may include any number of portions (e.g., two, three, ten, etc.). In those embodiments, the terms "top," "first," and "second portions" may be referenced per the number and location within the electronic document. For example, a seven-portioned electronic document may have its portions referenced as first portion (top), a plurality of middle portions, the second to last portion may be the sixth portion, and the last portion may be the seventh portion. In those embodiments, the operations involving the discussed second portion (e.g., determination operation 410 in FIG. 4) may then reference the last portion or boundary portion for a given electronic document. Further, in some example embodiments, it is appreciated that the trigger may be activated in other ways. For example, the trigger may be activated by detection of a boundary or border of the electronic document, and the trigger may be executed upon detection that the boundary has been reached and a swipe in the direction of the boundary has been performed.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some example embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module includes a general-purpose processor configured by software to become a special-purpose processor, the general-purpose processor may be configured as respectively different special-purpose processors (e.g., including different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-10I are implemented in some example embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the present subject matter in different contexts from the disclosure contained herein.

Figure 11:
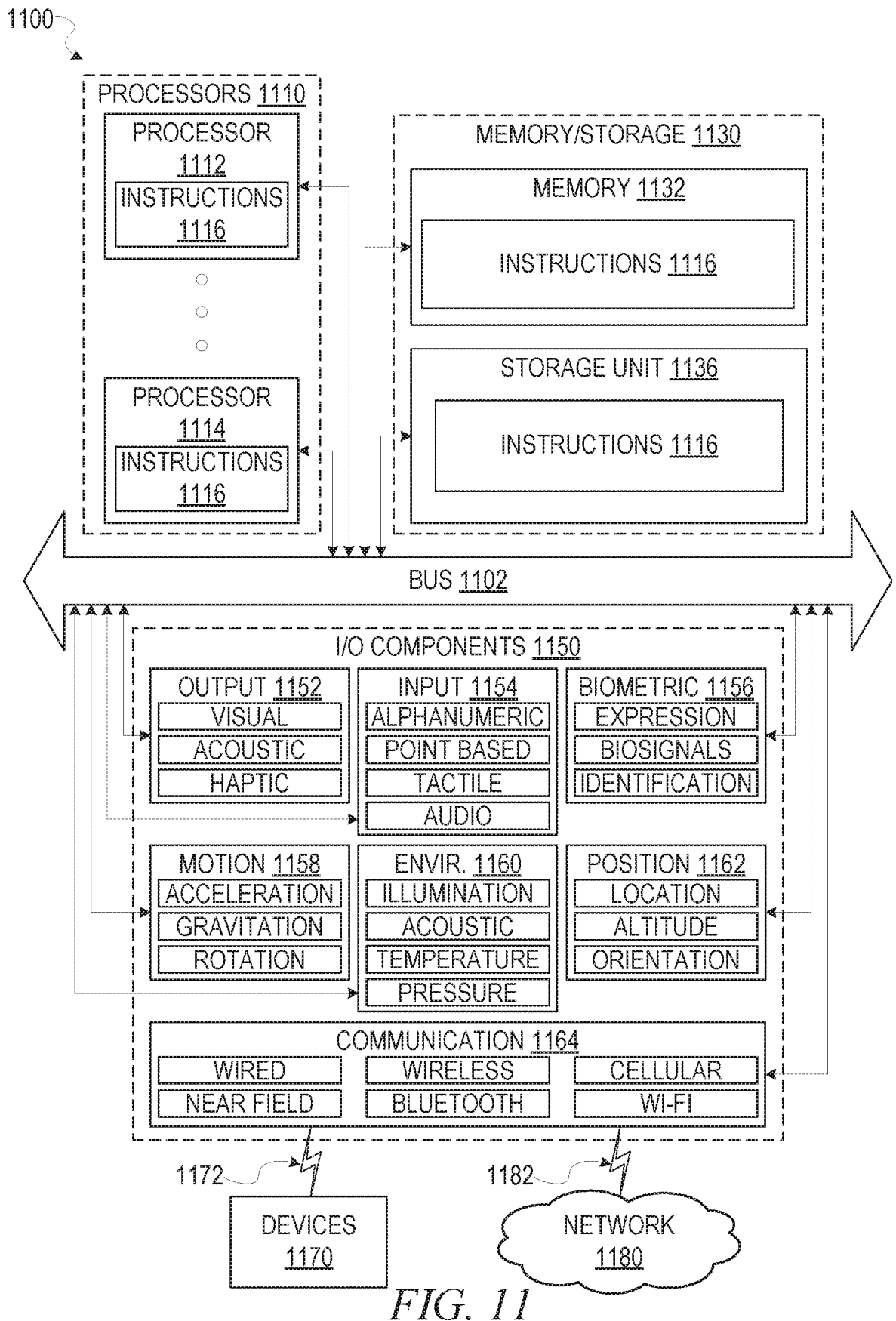
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an apples, an app, or other executable code) for causing the machine 1100 to perform any one or more of the methodologies discussed herein can be executed. For example, the instructions 1116 can cause the machine 1100 to execute the flow diagrams of FIGS. 3, 4, 5, 6, 8, and 9.

Additionally, or alternatively, the instruction 1116 can implement the interface engine 200, display engine 205, post series engine 210, trigger engine 215, and action engine 220 of FIG. 2, and so forth. The instructions 1116 transform the general, non-programmed machine into a particular machine programmed to carry out the described and illustrated functions in the manner described. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 can include processors 1110, memory/storage 1130, and I/O components 1150, which can be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1112 and processor 1114 that may execute instructions 1116. The term "processor" is intended to include multi-core processor that may include two or more independent processors (sometimes referred to as "cores") that can execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof.

The memory/storage 1130 can include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 can also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, the term "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 can include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 can include output components 1152 and input components 1154. The output components 1152 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1150 can include biometric components 1156, motion components 1158, environmental components 1160, or position components 1162 among a wide array of other components. For example, the biometric components 1156 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 can include acceleration sensor components (e.g., an accelerometer), gravitation sensor components, rotation sensor components (e.g., a gyroscope), and so forth. The environmental components 1160 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or other suitable device to interface with the network 1180. In further examples, communication components 1164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 can detect identifiers or include components operable to detect identifiers. For example, the communication components 1164 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, DATAGLYPH®, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 106, such as location via Internet Protocol (IP) geo-location, location via WI-FI®, signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or other type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1116 can be transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, the instructions 1116 can be transmitted or received using a transmission medium via the coupling 1172 (e.g., a peer-to-peer coupling) to devices 1170. The term "transmission medium" shall be taken to include any intangible medium that is capable of storing, encoding, or carrying the instructions 1116 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the present subject matter has been described with reference to specific example embodiments, various modifications and changes may be made to these embodiments without departing from the broader scope of embodiments of the present disclosure. The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" is construed in the Boolean sense, e.g., "A or B" may include A, may include B, or may include A and B. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, on a user device, from an electronic document server, a plurality of sequential full screen panels including a first full screen panel and a second full screen panel, the first full screen panel being navigable to the second full screen panel along a direction of navigation, the second full screen panel comprising a network site trigger configured to initiate a network site request to an external network site that is different from the electronic document server from which the plurality of sequential full screen panels is received;
   storing, on the user device, the plurality of sequential full screen panels;
   displaying the first full screen panel on a touchscreen display of the user device;
   receiving, on the first full screen panel, an initial touchscreen input to navigate from the first full screen panel to the second full screen panel along the direction of navigation;
   displaying, on the touchscreen display of the user device, the second full screen panel of the plurality of sequential full screen panels in response to receiving the initial touchscreen input on the first full screen panel;
   activating the network site trigger in response to the second full screen panel being displayed on the user device, the second full screen panel displaying a user interface element specifying a touchscreen gesture to perform on the second full screen panel to interact with the external network site;
   receiving, through the touchscreen display, the specified touchscreen gesture on the second full screen panel; and
   executing the network site trigger in response to receiving the specified touchscreen gesture on the second full screen panel that comprises the network site trigger, the executing of the network site trigger causing the user device to transmit the network site request to the external network site.

2. The method of claim 1, wherein the external network site is a third-party server, and wherein the method further comprises:
   receiving, from the third-party server, a network response comprising display content; and
   storing, in memory of the user device, the display content from the third-party server.

3. The method of claim 2, further comprising: displaying the display content on the touchscreen display of the user device.

4. The method of claim 3, further comprising:
   minimizing the second full screen panel to display the display content on the touchscreen display of the user device.

5. The method of claim 1, wherein the network site request transmitted to the external network site includes user data of a user of the user device.

6. The method of claim 5, wherein the user data includes a user identifier of the user.

7. The method of claim 1, wherein the touchscreen gesture is at least one of: a tap gesture or a swipe gesture.

8. The method of claim 1, wherein the network site trigger is triggered by code embedded in the second full screen panel.

9. The method of claim 8, wherein the second full screen panel is initially displayed without executing the code embedded in the second full screen panel.

10. The method of claim 1, wherein the plurality of sequential full screen panels are displayed in a primary application display area of a full screen size, and wherein the first full screen panel and the second full screen panel both have a screen size that coincides with the full screen size.

11. The method of claim 10, wherein the receiving the initial touchscreen input comprises receiving, through the touchscreen display, the initial touchscreen input anywhere within the first full screen panel, and wherein the receiving the specified touchscreen gesture comprises receiving, through the touchscreen display, the specified touchscreen gesture anywhere within the second full screen panel.

12. The method of claim 1, wherein the user interface element is displayed at a bottom side of the second full screen panel.

13. The method of claim 12, wherein the user interface element comprises one or more text items.

14. A system, the system comprising:
   one or more processors of a machine;
   a touchscreen display; and
   a memory storing instructions that, when executed by the one or more processors, cause the machine to perform operations comprising:
   receiving, from an electronic document server, a plurality of sequential full screen panels including a first full screen panel and a second full screen panel, the first full screen panel being navigable to the second full screen panel along a direction of navigation, the second full screen panel comprising a network site trigger configured to initiate a network site request to an external network site that is different from the electronic document server from which the plurality of sequential full screen panels is received;
   storing the plurality of sequential full screen panels;
   displaying the first full screen panel on the touchscreen display;
   receiving, on the first full screen panel, an initial touchscreen input to navigate from the first full screen panel to the second full screen panel along the direction of navigation;
   displaying, on the touchscreen display, the second full screen panel of the plurality of sequential full screen panels in response to receiving the initial touchscreen input on the first full screen panel;
   activating the network site trigger in response to the second full screen panel being displayed, the second full screen panel displaying a user interface element specifying a touchscreen gesture to perform on the second full screen panel to interact with the external network site;

receiving, through the touchscreen display, the specified touchscreen gesture on the second full screen panel; and executing the network site trigger in response to receiving the specified touchscreen gesture on the second full screen panel that comprises the network site trigger, the executing of the network site trigger causing the network site request to be transmitted to the external network site.

15. The system of claim 14, wherein the external network site is a third-party server, and wherein the operations further comprise:

receiving, from the third-party server, a network response comprising display content; and storing the display content from the third-party server.

16. The system of claim 15, the operations further comprising: displaying the display content on the touchscreen display.

17. The system of claim 16, the operations further comprising:

minimizing the second full screen panel to display the display content on the touchscreen display.

18. The system of claim 14, wherein the network site request transmitted to the external network site includes user data of a user.

19. A non-transitory machine-readable storage medium embodying instructions that, when executed by a machine, cause the machine to perform operations comprising:

receiving, from an electronic document server, a plurality of sequential full screen panel user interfaces includes a first full screen panel and a second full screen panel, the first full screen panel being navigable to the second full screen panel along a direction of navigation of the plurality of sequential full screen panel user interfaces, the second full screen panel comprising a network site trigger configured to initiate a network site request to an external network site that is different from the electronic document server from which the plurality of sequential full screen panel user interfaces is received;

storing the plurality of sequential full screen panel user interfaces; displaying the first full screen panel on a touchscreen display;

receiving, on the first full screen panel, an initial touchscreen input to navigate from the first full screen panel to the second full screen panel along the direction of navigation;

displaying, on the touchscreen display, the second full screen panel of the plurality of sequential full screen panel user interfaces in response to receiving the initial touchscreen input on the first full screen panel;

activating the network site trigger in response to the second full screen panel being displayed, the second full screen panel displaying a user interface element specifying a touchscreen gesture to perform on the second full screen panel to interact with the external network site;

receiving, on the second full screen panel, the specified touchscreen gesture; and executing the network site trigger in response to receiving the specified touchscreen gesture on the second full screen panel that comprises the network site trigger, the executing of the network site trigger causing the network site request to be transmitted to the external network site.

20. The non-transitory computer-readable storage medium of claim 19, wherein the external network site is a third-party server, and wherein the operations further comprise:

receiving, from the third-party server, a network response comprising display content; and storing the display content from the third-party server.

* * * * *